United States Patent
Lior

(10) Patent No.: US 7,404,286 B2
(45) Date of Patent: Jul. 29, 2008

(54) ORBITING COMBUSTION NOZZLE ENGINE

(75) Inventor: David Lior, Herzeliya (IL)

(73) Assignee: R-Jet Engineering Ltd., Herzeliya (IL)

( * ) Notice: Subject to any disclaimer, the term of this patent is extended or adjusted under 35 U.S.C. 154(b) by 537 days.

(21) Appl. No.: 10/518,767

(22) PCT Filed: May 26, 2003

(86) PCT No.: PCT/IL03/00434

§ 371 (c)(1),
(2), (4) Date: Dec. 21, 2004

(87) PCT Pub. No.: WO2004/003357

PCT Pub. Date: Jan. 8, 2004

(65) Prior Publication Data

US 2005/0235648 A1    Oct. 27, 2005

(51) Int. Cl.
  *F02C 3/14*  (2006.01)
  *F02C 3/34*  (2006.01)
  *F02C 7/18*  (2006.01)

(52) U.S. Cl. .................. 60/39.35; 60/39.34; 60/726; 60/750

(58) Field of Classification Search ............ 60/750, 60/806, 39.34, 39.35, 726
See application file for complete search history.

(56) References Cited

U.S. PATENT DOCUMENTS

| | | | |
|---|---|---|---|
| 2,465,856 A | 3/1949 | Emigh | |
| 2,499,863 A | 3/1950 | Hart | |
| 2,594,629 A | 4/1952 | Exner | |
| 2,784,551 A * | 3/1957 | Karlby et al. | 60/39.35 |
| 2,793,496 A * | 5/1957 | Mortimer | 60/39.35 |
| 3,200,588 A | 8/1965 | Math | |
| 3,557,551 A | 1/1971 | Campbell | |
| 4,226,087 A * | 10/1980 | Spadaccini | 60/749 |
| 4,368,619 A * | 1/1983 | Levesque | 60/39.35 |
| 4,897,995 A * | 2/1990 | Guirguis | 60/39.35 |
| 5,782,079 A * | 7/1998 | Chiang et al. | 60/804 |
| 5,927,076 A * | 7/1999 | Pillsbury | 60/749 |
| 6,272,844 B1 | 8/2001 | Rakhmailov | |
| 6,295,802 B1 | 10/2001 | Lior | |
| 6,460,343 B1 | 10/2002 | Rakhmailov | |
| 6,474,070 B1 * | 11/2002 | Danis et al. | 60/754 |

OTHER PUBLICATIONS

NACA Research Memorandum; Weight-flow and thrust limitations due to the use of rotating combustors in a turbojet engine by Lexberg et al . Aug. 1956—National Advisory Committee for Aeronautics.

* cited by examiner

*Primary Examiner*—Ted Kim
(74) *Attorney, Agent, or Firm*—Mark M. Friedman

(57) ABSTRACT

An orbiting combustor nozzle (OCN) engine, having a rotating assembly comprising a co-rotating compressor and nozzle wheel enclosed within a non-rotating outer casing, defining a rotating combustion chamber, is disclosed. Combustion occurs in the combustion chamber in a vortex of gas that rotates at the same angular velocity as the rotating assembly. Also disclosed, is a method of cooling a blade of a rotating wheel, such as a turbine wheel or nozzle wheel, by projecting cool air at the base of the vane form a nozzle corotating with the blade. Such cooling is easily implemented in an OCN engine with use of an innovative annular combustor. Also disclosed is a method of countering axial backflow by use of a combustion chamber compressor.

3 Claims, 12 Drawing Sheets

FIG. 6B
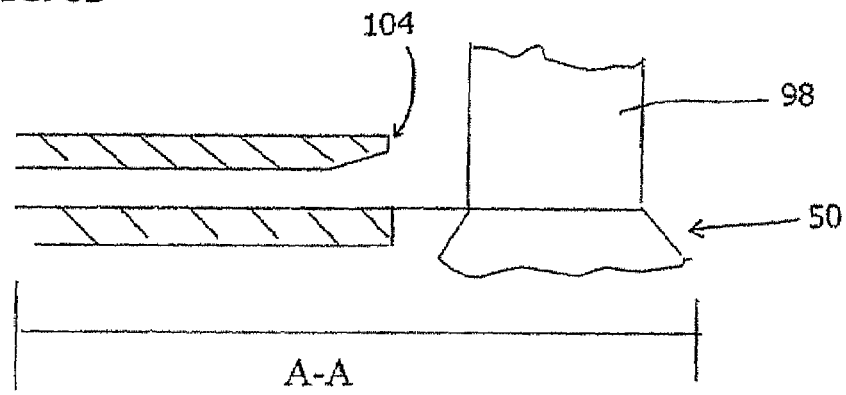
FIG. 6A
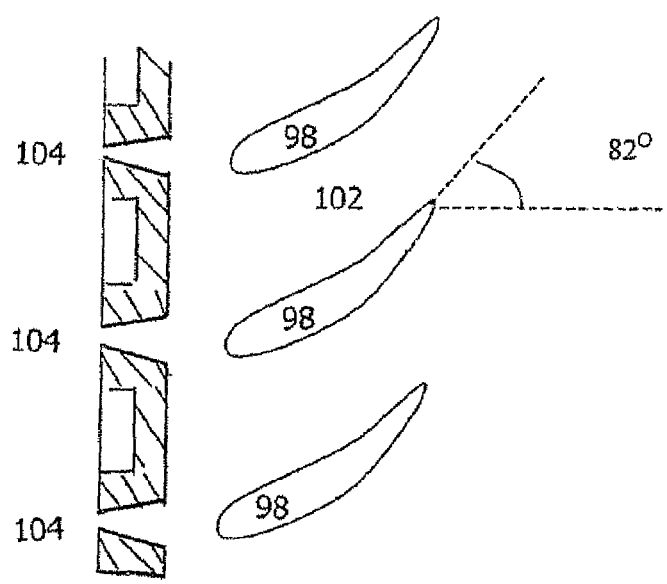
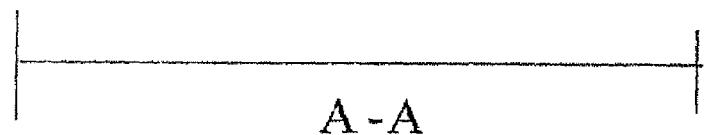

ORBITING COMBUSTION NOZZLE ENGINE

FIELD AND BACKGROUND OF THE INVENTION

The present invention relates to an engine and specifically to an engine having a rotating assembly comprising a co-rotating compressor and compressor-driving nozzle wheel enclosed within a non-rotating outer casing, thus defining a rotating combustion chamber.

In a conventional turbine engine 10, depicted in FIG. 1, one or more non-rotating combustion chambers 12 are found between a compressor 14 and a turbine 16. Compressor rotor 18 and turbine wheel 20 are attached to a common rotating shaft 22. During operation of engine 10, compressor 14 forces air into engine 10 towards combustion chambers 12. Non-rotating terminal stator vanes 24 in compressor 14 direct air at high pressure into combustion chambers 12 through what is generally called a diffuser or diffusion stage. In combustion chambers 12 fuel is mixed with the high pressure air. The fuel-air mixture burns and as a result of the released heat, the exhaust expands outwards through turbine 16. In succeeding stages of turbine 16, stationary nozzle guide vanes 30 of turbine 16 accelerate and redirect exhaust gases at rows of turbine blades 32 of turbine wheel 20. The high velocity exhaust gases impact on turbine blades 32 and produce torque on turbine wheel 20 that rotates shaft 22, driving compressor rotor 18.

One weakness of prior art turbine engines, such as 10 is in the turbine. High efficiency and high power output depends on fast rotation of turbine wheel 20, achieved by directing high-temperature high-velocity gas jets from between nozzle guide vanes 30 at turbine blades 32. The mechanical and thermal stresses on turbine blades 32 are so high that engine efficiency is limited by the material properties of turbine blades 32. Thus even though high velocity gas jets can be easily obtained, these cannot be efficiently utilized due to the shortened lifetime of the turbine blades. Long-life can be obtained by diluting exhaust to produce gas jets having only moderate temperature and velocity and limiting the rate of rotation of the turbine wheel. This results in low efficiency and a limited power output.

A number of turbineless engines been designed overcoming the limitations imposed by the use of a turbine, see U.S. Pat. Nos. 2,465,856, 2,499,863, 2,594,629, 3,200,588, and 6,295,802. All these turbineless engines have a plurality of combustion chambers, rigidly arrayed about a power shaft having nozzles directed substantially perpendicularly to the power shaft. Exhaust exiting from the combustion chambers through the nozzles drives the combustion chambers about the power shaft and creates torque in a manner analogous to Hero's Aeolipile. These turbineless engines have failed to gain popularity, amongst other reasons, due to an excessive moment of inertia and extreme hoop stress resulting from the positioning of the combustion chambers.

U.S. Pat. No. 3,557,551 teaches a turbine engine where the velocity at which gas emerging from rotating nozzles strikes a turbine is reduced. To this end, a combustion chamber and nozzles are allowed to rotate as a result of gases escaping through the nozzles. Simultaneously, the gas escaping from the nozzles impacts the turbine blades, turning a turbine wheel in a direction opposite the direction which the combustion chamber and nozzles rotate. Torque is extracted from both rotations. The primary disadvantage of this design is similar to the disadvantage of the turbineless engines described above: the combustion chambers (termed combustor baskets) undergo severe hoop stress. An additional disadvantage of this design is that air is fed into the combustion chambers using a ram effect and consequently suffers severe aerodynamic entry losses.

A different design, called a rotojet, is taught in "Weight-flow and thrust limitations due to the use of rotating combustors in a turbojet engine" by Lezberg, E. A.; Blackshear, P. L.; and Rayle, W. D. Research Memorandum RM E55K16 of the National Advisory Commitee for Aeronautics (1956). In the rotojet, a compressor stage, a turbine and a plurality of ramjet-like combustion chambers having off-axis reaction nozzles rotate together. Similar to the turbineless engines described above, the individual combustion chambers ("ramjets") undergo severe hoop stress.

Another weakness of prior art turbine engines, such as 10 is in the thermodynamics of the engine. Due to the braking of gases exiting compressor 14 through the non-rotating stator vanes 24 before entering combustion chamber 12 and due to the expansion of gases when the gases expand through nozzle guide vanes 30 in order to drive turbine wheel 20, there are significant pressure drops and the actual thermodynamic cycle is far from being an ideal Brayton cycle (see Appendix). Thus, prior art turbine engines, such as 10, are inherently inefficient. None of the alternative turbine engines described above presents a solution to the inherent thermodynamic inefficiency of the turbine engine.

In U.S. Pat. Nos. 6,272,844 and 6,460,343, one related to the other, are taught turbine engines without inlet turbine stators to reduce the inlet pressure drop. In these engines a vortex is created in part of the compressor outlet flow by adding a swirler stator at the compressor outlet. This solution is inefficient as the air from the compressor is first diffused at the rotor exit and is again expanded in the swirler, reducing the pressure even further. Moreover, the combustion chamber is stationary, creating further pressure drops and various stationary envelopes. Moreover, in both U.S. Pat. Nos. 6,272,844 and 6,460,343, the fact that the combustor is stationary creates pressure drops due to friction between the vortex and the various stationary envelopes.

There is a need for an engine that overcomes the above-listed shortcomings of prior art engines, especially prior art turbine, engines.

SUMMARY OF THE INVENTION

The above and other aims are achieved by the orbiting combustion nozzle (OCN) engine of the present invention.

According to the teaching of the present invention there is provided an engine, comprising: a. a rotating assembly including a primary compressor, an inner casing and a compressor-driving nozzle wheel; b. an outer casing, enclosing the rotating assembly so that at least one combustion chamber is defined in the space between the primary compressor, the inner casing, the compressor-driving nozzle wheel and the outer casing, the engine characterized in that the outer casing does not rotate with the rotating assembly.

According to a feature of the present invention the at least one combustion chamber is substantially a single annular combustion chamber.

According to a feature of the present invention the engine further comprises a combustion chamber compressor in the combustion chamber. In one embodiment, such a combustion chamber compressor includes a plurality of vanes attached to the inner casing.

According to a feature of the present invention, the rotating assembly further includes a substantially annular flame holder disposed within the combustion chamber.

According to a feature of the present invention, the engine further comprises a substantially tubular element surrounding the inner casing, wherein a leading edge of the tubular element is positioned aft of the primary compressor so as to divide airflow from the primary compressor into an outer airflow and an inner airflow, wherein the outer airflow is between the tubular element and the non-rotating outer casing and wherein the inner airflow is between the tubular element and the inner casing. In some embodiments of the present invention, through the substantially tubular element are perforations allowing communication between the inner airflow and the outer airflow.

According to a feature of the present invention, the engine further comprises a rotating diffuser between the primary compressor and the combustion chamber. According to a further feature of the present invention the rotating diffuser includes extensions to the terminal blades of the primary compressor.

According to a feature of the present invention, the rotating assembly of an engine of the present invention includes at least one fuel injector.

In U.S. Pat. No. 6,272,844 and the related U.S. Pat. No. 6,460,343 are taught engines having no inlet turbine stators. This is done in order to reduce the pressure drop at the turbine entrance. A vortex is created in the combustion chamber by the use of a swirler stator at the compressor outlet. This solution is inefficient as air at the compressor outlet has already been diffused at the rotor exit. By again expanding the air in the swirler, the pressure is further reduced.

The present invention avoids analogous pressure losses by substantially maintaining an airflow vortex produced by a compressor through a rotating combustion chamber and through a nozzle wheel.

Another disadvantage of the teachings of U.S. Pat. Nos. 6,272,844 and 6,460,343 is that therein the vortex is generated by a swirler for only for a portion of the compressor airflow. This results in a relatively low vortex angular velocity at the turbine inlet, reducing efficiency.

In contrast, according to the teachings of the present invention, the entire airflow from the compressor makes up the airflow vortex, so that the angular velocity of the vortex is substantially similar to the angular velocity of the nozzle wheel.

As still further disadvantage of the teachings of U.S. Pat. Nos. 6,272,844 and 6,460,343 is that the combustor, being stationary, creates pressure drops due to vortex/stationary envelope friction.

In an engine of the present invention under certain operating conditions an axial backflow can occur. Axial backflow is also known to occur in other engines, for example in gas turbine engines where swirls are generated to increase air/fuel mixing efficiency. When axial backflow occurs, hot air from the aft section of the combustor flows forwards. To counter axial backflow, there is also provided according to the teachings of the present invention an engine comprising: a a combustion chamber having an axis; and b. a combustion chamber compressor, coaxial with and radially inwards from the combustion chamber, the combustion chamber compressor configured to counteract axial backflow in the combustion chamber.

According to a feature of the present invention the combustion chamber compressor includes: c. at least one combustion chamber compressor blade arrayed about the axis of the combustion chamber in at least one circle; and d. a substantially tubular combustion chamber compressor body encasing the combustion chamber compressor blades.

According to a feature of the present invention the combustion chamber compressor includes: c. a rotating combustion chamber inner casing coaxial with the combustion chamber; d. at least two combustion chamber compressor blades rigidly attached to the rotating combustion chamber inner casing and arrayed about the axis of the combustion chamber in at least one circle; and e. a substantially tubular combustion chamber compressor body encasing the combustion chamber compressor blades.

According to a feature of the present invention the combustion chamber compressor blades are arrayed in one or more circles about the axis (preferably symmetrically within each circle) where each circle includes at least two, preferably more than two blades.

Combustion engines, especially those operating at high temperatures, often produce undesirably large quantities of polluting $NO_X$ emissions. One method of reducing such emissions is to reduce the oxygen content of the combustion mixture by mixing exhaust into the combustion mixture, a process known in the art as exhaust reinjection. The preferred method of exhaust reinjection for an engine of the present invention uses the fact that there exists a radial pressure gradient in the engine, where there is a lower static pressure closer to the axis then further from the engine axis. Thus, there is also provided according to the teachings of the present invention in an engine having a combustion chamber wherein a mixture of fuel and air is burned, a method of reducing $NO_X$ emissions by: a making a combustible mixture by combining exhausts fuel and air in a first region of the engine; and b. burning the combustible mixture in the combustion chamber; wherein the exhaust is taken from a second region of the engine that has a higher static pressure than that of the first region.

Turbines blades of turbine engines are exposed to high centrifugal stress and as a result often break at the base due to creep at high temperatures. The preferred prior art method of injecting a cooling fluid through turbine blades fashioned with special cooling channels is expensive. Centrifugal stress is also a problem to which the nozzle wheel of an engine of the present invention is subject and in fact a general problem encountered in other devices having a rotating wheel with blades herein referred to as a bladed rotating wheel). Thus, there is also provided according to the teachings of the present invention a method of cooling a blade of a bladed rotating wheel attached to the terminal end of a rotating axis through a blade base, by: a providing at least one substantially axial channel rotating with the rotating axis, the at least one channel having an inlet and an outlet; b. feeding a cooling fluid into the the channel through the inlet; and c. directing the cooling fluid emerging from the channel through the outlet at the blade base to be cooled.

In order to increase cooling efficiency especially in cases where the pressure at the inlet is too low to ensure a sufficient flow of cooling fluid from the outlet, the pressure of the cooling liquid emerging through the outlet is increased by using a pressure-increasing device positioned inside the channel, for example a combustion chamber compressor as described hereinabove. According to a feature of the present invention, the bladed rotating wheel is a nozzle wheel or a turbine, and the blade is a nozzle wheel blade or a turbine blade, respectively.

According to a feature of the present invention, centrifugal forces are used to transport cooling fluid emerging from the outlet along a leading edge of the blade being cooled.

U.S. Pat. No. 6,272,844 teaches a method of turbine blade cooling in which a rotating bladed disc is attached to a rotating turbine wheel. The effect is that a portion of the cool air from the compressor is transported through a passages to emerge in front of a respective turbine blade. The cool air envelopes and cools the respective turbine blade. Despite a superficial similarity to the present invention, it is highly doubtful that the teachings of U.S. Pat. No. 6,272,844 shall function as described.

The primary problem with such a solution problem is that air entering the inlets of the passages (designated 40 in U.S. Pat. No. 6,272,844) is unable to flow through the passages and emerge through the cooling outlets (designated 44 in U.S. Pat. No. 6,272,844). This is a result of the fact that since the air at the inlet is not centrifuged, the static pressure in the vicinity of the inlets is lower than the static pressure in the outlets. In fact, under such conditions hot air will flow radially from the periphery of the turbine towards the axis heating, rather than cooling, the turbine blades.

There is also provided according to the teachings of the present invention a method of producing torque by: a) providing a vortex of a fluid rotating at a first angular velocity about an axis; b) directing fluid from the vortex through at least one nozzle, the nozzle rotating on a shaft at a second angular velocity about the axis; and c) extracting the torque from the shaft.

According to a feature of the present invention, the first angular velocity and the second angular velocity are substantially equal. According to a further feature of the present invention the vortex is enclosed within a non-rotating outer casing.

There is also provided according to the teachings of the present invention a method of producing torque by: a. generating a vortex of compressed air rotating at a first angular velocity about an axis; b. mixing a combustible fuel with the compressed air; c. burning the fuel within the vortex; d. directing air heated by the burning from the vortex through at least one nozzle, the nozzle rotating on a shaft at a second angular velocity about the axis; and e. extracting the torque from the shaft.

According to a feature of the present invention, the first angular velocity and the second angular velocity are substantially equal. According to a further feature of the present invention the vortex of air is enclosed within a non-rotating outer casing. According to a still further feature of the present invention, the vortex is generated by a compressor rotating about the vortex axis at the second angular velocity.

BRIEF DESCRIPTION OF THE DRAWINGS

The invention is herein described, by way of example only, with reference to the accompanying drawings, wherein:

FIG. 6A is an axial cross section of a compressor-driving nozzle wheel depicting three nozzle wheel blades, two nozzles and an implementation of the blade cooling method of the present invention;

FIG. 6B depicts, in cross section in a cylindrical plane that is coaxial with the axis of an OCN engine, details of the cooling of the base of a blade of a compressor-driving nozzle wheel according to the method of the present invention;

DETAILED DESCRIPTION OF THE INVENTION

The engine of the present invention is characterized in having a rotating assembly comprising a co-rotating compressor and nozzle wheel enclosed within a non-rotating outer casing, thus defining a rotating combustion chamber. Since, in contrast to prior art turbines, in the engine of the present invention there is no turbine wheel and torque is generated using a rotating nozzle wheel, and because combustion occurs in a vortex of air rotating together with the rotating assembly, the engine of the present invention is called an orbiting combustion nozzle (OCN) engine.

Figure 1:
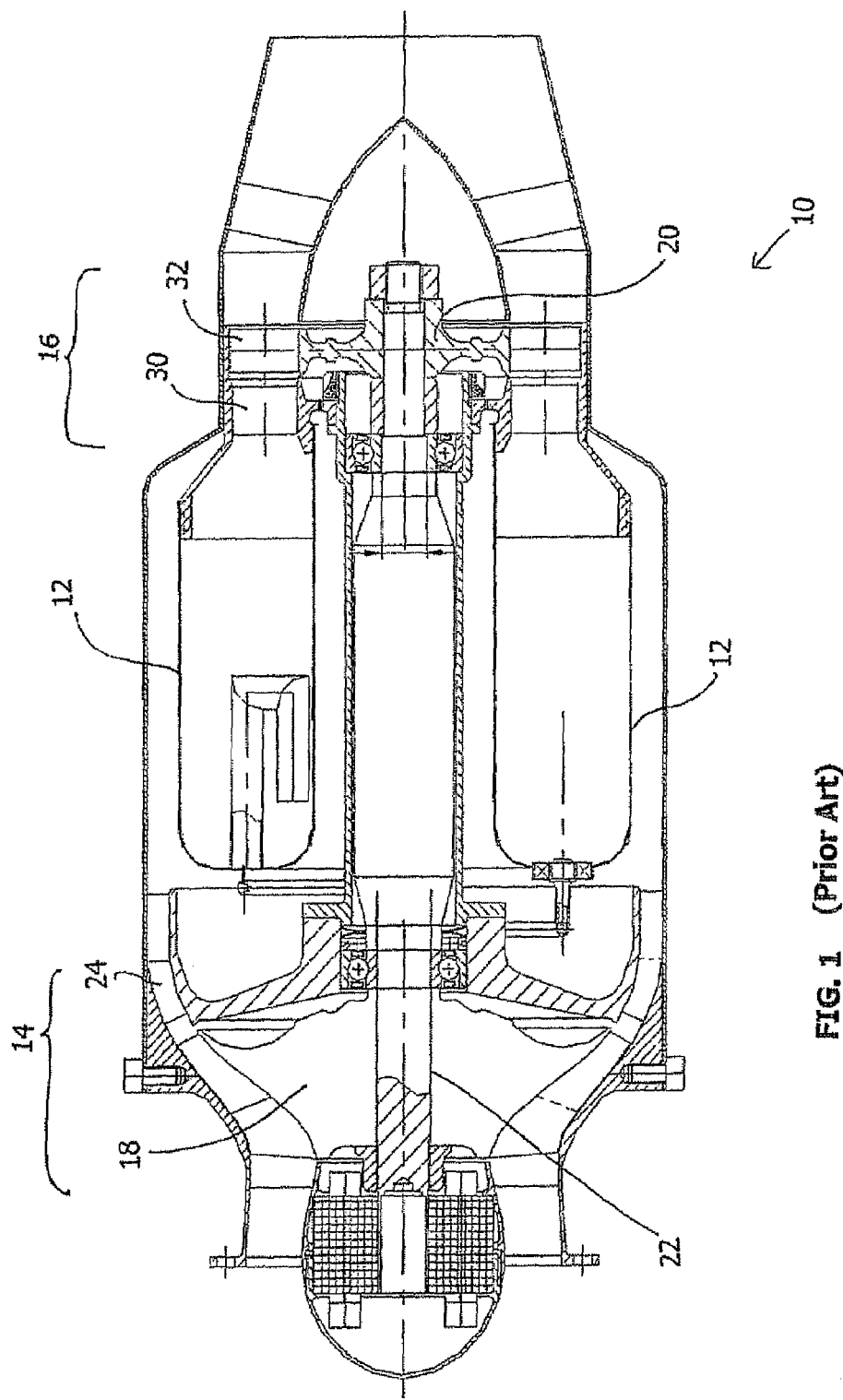
FIG. 1 (prior art) is a largely cross-sectional depiction of a conventional turbine engine.
Figure 2:
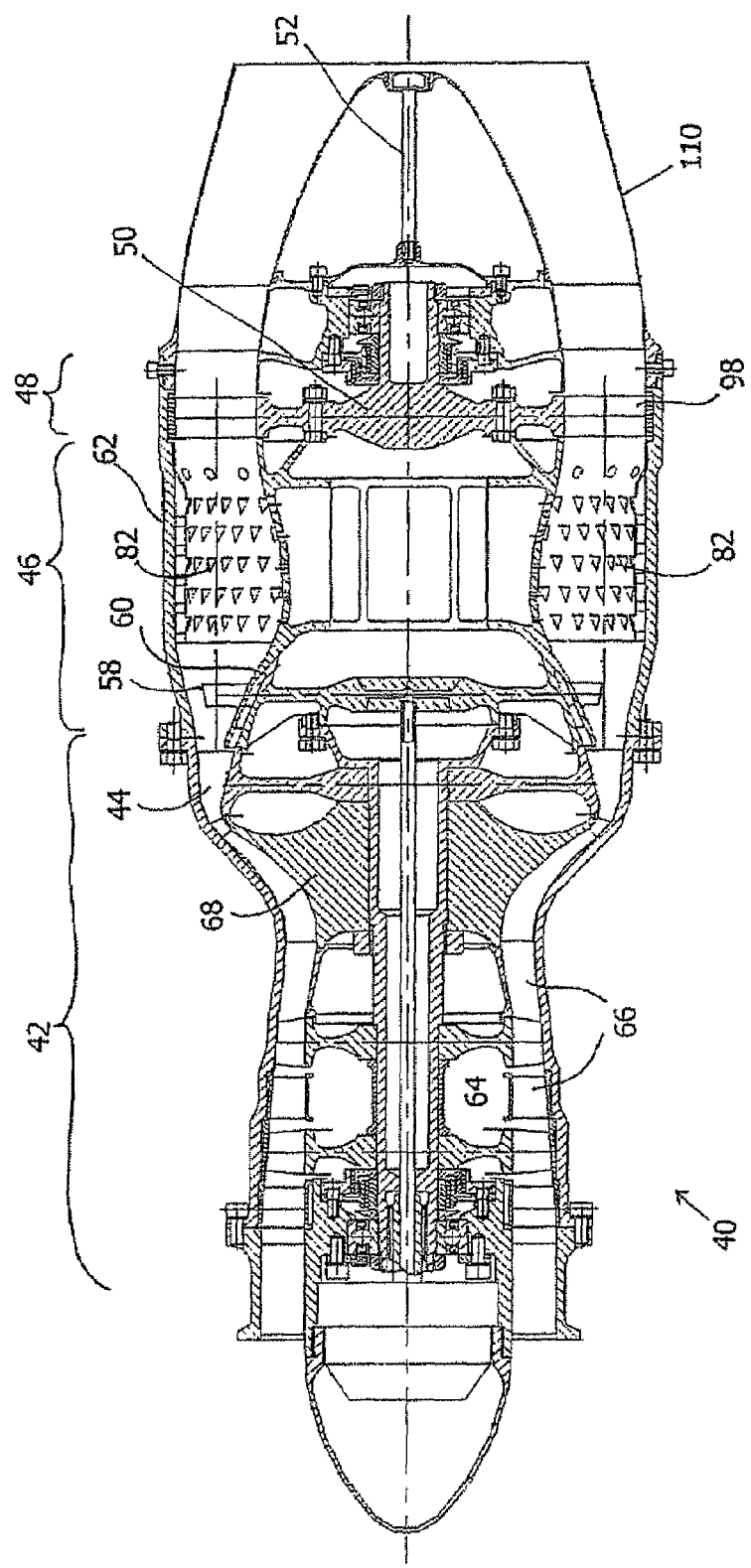
FIG. 2 is a largely cross-sectional depiction of a turbojet embodiment of an OCN engine of the present invention having rotating fuel injectors that are part of the flame holders.

The principles and operation of an OCN engine according to the present invention may be better understood with reference to the drawings and the accompanying description. In the drawings, like references designate equivalent parts A typical, non-limiting, embodiment of an OCN engine 40 is schematically depicted in FIG. 2. This depiction, and other depictions below, are primarily in cross section. It will be clear in the following discussion which depicted elements (for example air slots 82) are not depicted in cross section. OCN engine 40 is analogous to a prior art turbojet engine such as turbine engine 10 depicted in FIG. 1. As with prior art turbine engines, OCN engine 40 has a compressor 42 and a combustion chamber 46. However, unlike turbine engine 10 where non-rotating terminal stator vanes 24 direct compressed air from compressor 14 to combustion chambers 12, in an OCN engine such as 40 air is directed from compressor 42 to combustion chamber 46 by rotating diffuser blades 44. Further, unlike combustion chamber 12 of of turbine engine 10, combustion chamber 46 of OCN engine 40 is a rotating combustion chamber. Combustion chamber 46 of OCN engine 40 is depicted in detail in FIG. 2A. Further, instead of a turbine 16, torque to drive compressor 42 is produced in torque-section 48 using a compressor-driving nozzle wheel 50.

Defining the axis of engine 40 is rotating shaft 52. OCN engine 40 has a rotating assembly 54 (see FIG. 2B) including rotating shaft 52 to which are connected axial stage compressor rotors 64, compressor impeller 68, flame holders 58, inner casing 60 and compressor-driving nozzle wheel 50. In some embodiments of an OCN engine, some elements of rotating assembly 54 are not directly attached to rotating shaft 52, but rather indirectly attached, for example, through inner casing 60. Significantly, during operation of OCN engine 40, all parts of rotating assembly 54 rotate with the same angular velocity about the axis of engine 40. In some embodiments of an OCN engine other engine components are also part of a corresponding rotating assembly. Rotating assembly 54 is encased in a non-rotating outer casing 62. It is important to note that the inner surface of stationary outer casing 62 is considered as a part of combustion chamber 46.

Compressor

Just as a prior art turbine engine such as 10, an OCN engine made in accordance with the teachings of the present invention has a compressor. A compressor of an OCN engine is substantially similar to prior art compressors and is of any type commonly used in turbine engines, such as a centrifugal flow compressor, an axial-flow compressor or a dual axial-centrifugal-flow compressor. The advantages of the various compressor configurations are well-known to one skilled in the art and needs not be discussed hereinfurther.

An important difference, however, between compressors of prior art turbine engines such as 10 and compressor 42 of an OCN engine is that in an OCN engine there is no static stator 24. This lack is discussed hereinbelow in the section relating to the diffuser.

OCN engine 40 in FIG. 2 is equipped with a dual axial-centrifugal compressor 42 having two axial compressor rotors 64, stator vanes 66 and a centrifugal impeller 68.

It is important to note that in some embodiments of the present invention, an engine is equipped with more than one compressor. Therefore, in some cases a compressor, such as 42 of OCN engine 40 is referred to as a primary compressor.

Rotating Diffuser

Prior art turbine engines such as 10 have an axial air flow through combustion chambers 12. The function of non-rotating terminal stator vanes 24 making up a stationary diffuser stage is to receive air from compressor rotor 14, axialize the airflow and convert velocity to static pressure. In a prior art turbine engines such as 10 air typically enters the diffusion stage with a velocity of 400 m/sec and is slowed down by diffusion and the effect of non-rotating terminal stator vanes 24 to a velocity of about 70 m/sec. This braking leads to a 5%-10% loss in compressor efficiency.

In contrast, in an OCN engine air entering the combustion chamber travel in a vortex about the engine axis. Accordingly, an OCN engine does not have a stationary diffuser stage but a rotating diffuser stage. In an OCN engine the rotating diffuser directs the air flow exiting the compressor towards the combustion chamber and converts relative velocity to static pressure. However, the airflow vortex is not damped, but is rather preferably enhanced.

In a most simple embodiment, the diffuser stage of an OCN engine substantially includes rotating diffuser blades as extensions of the blades of the terminal compressor rotor or impeller. The shape of the chamber wherein the diffuser blades rotate is such that rotation of the vortex of air exiting a corresponding compressor impeller is directed, as a vortex, towards the combustion chamber. Further, due to the reduction in airflow velocity that occurs from the impeller through the diffuser, the static pressure of the airflow is increased while the rotational momentum of the gas vortex is conserved or even enhanced. As the velocity of the air in an OCN engine is measured relative to rotating parts, the velocity reduction is low, for example from about 200 m/sec (relative velocity) to 100 m/sec due to deceleration through the diffuser, leading to a mere 2% loss of compressor efficiency.

Figure 2A:
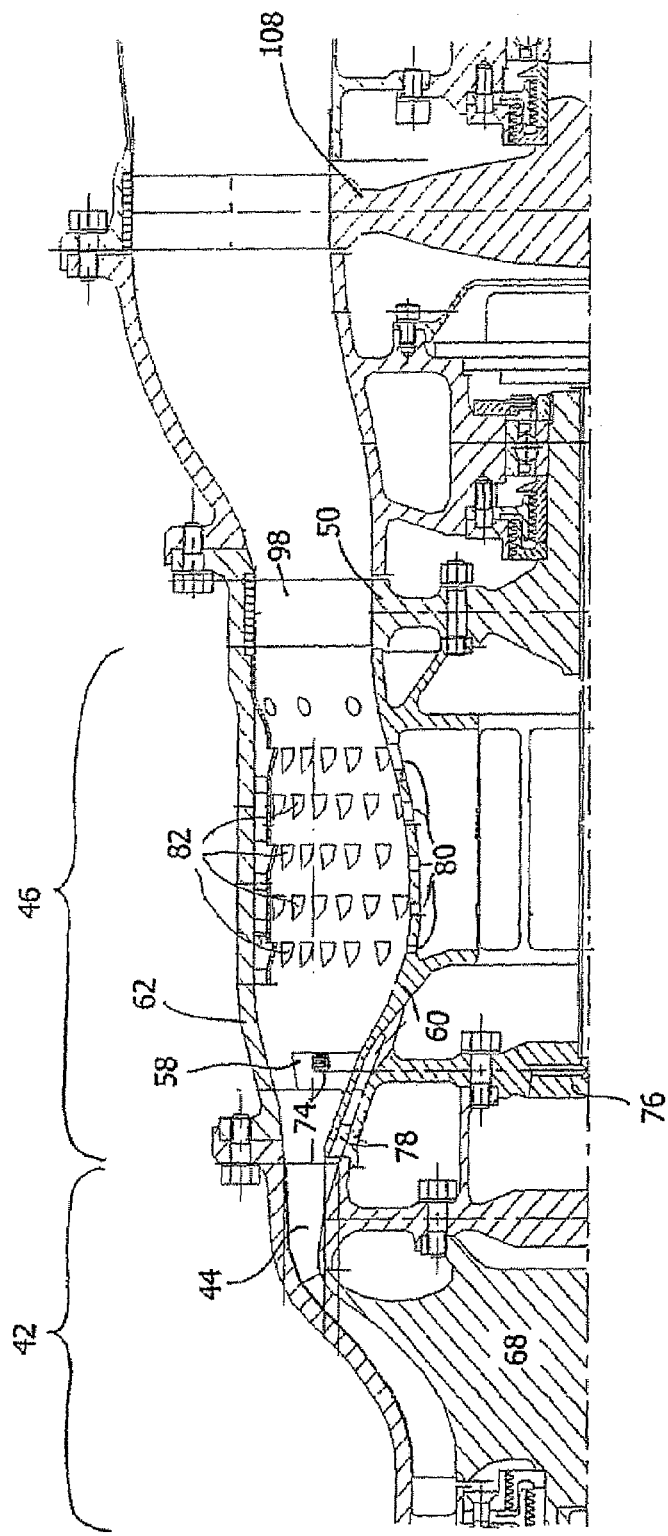
FIG. 2A is largely cross-sectional depiction of the combustion chamber of a turbojet embodiment of an OCN engine of the present invention.
Figure 2B:
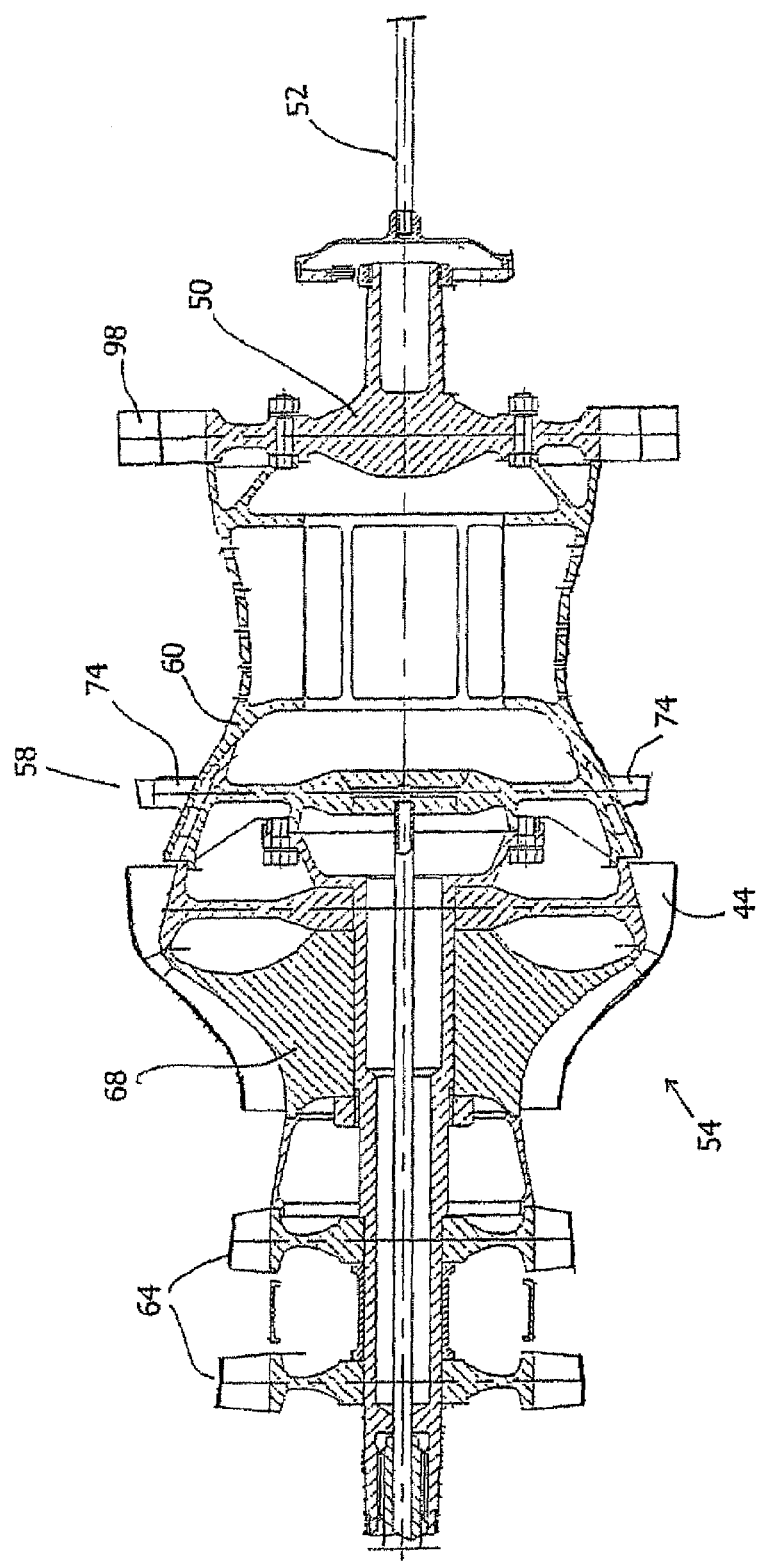
FIG. 2B is a longitudinal section of a rotating assembly of an embodiment of an OCN engine.

As depicted in FIG. 2 and in FIG. 2b, rotating diffuser blades 44 of OCN engine 40 are simply physical extensions of the blades of centrifugal impeller 68. Rotating diffuser blades 44 enhance the rotational momentum of the gas vortex entering rotating combustion chamber 46 of engine 40.

Rotating Combustion Chamber

There exist many combustion chamber configurations for prior art turbine engines. In an OCN engine, the combustion chamber is substantially a vortex-flow annular type combustion chamber where the gases travel in a vortex about the central axis of the engine itself. However, since the gas vortex rotates with substantially the same angular velocity as the compressor, the diffuser and the compressor-driving nozzle wheel, in the rotating assembly frame of reference the combustion chamber is an axial-flow type combustion chamber, in which the swirl velocity is relatively low (expected to be typically about 80 m/sec).

Structurally a combustion chamber of an OCN engine, for example combustion chamber 46 of OCN engine 40 depicted in FIG. 2A, is substantially a single annular chamber defined by rotating assembly 54 and the inner surface of non-rotating outer casing 62.

During operation of OCN engine 40, air propelled by rotating diffuser blades 44 is mixed with fuel from rotating injectors 74 making up part of rotating flame holders 58. A primary zone for combustion is created by rotating flame holders 58, generating a homogenous annular flame.

Placement of Fuel Injectors

A first preferred location to place fuel injectors in an OCN engine is together with or in the proximity of the flame holders, as depicted in FIGS. 2, 2A and 2B where rotating injectors 74 of OCN engine 40 are part of rotating flame holders 58.

Figure 3:
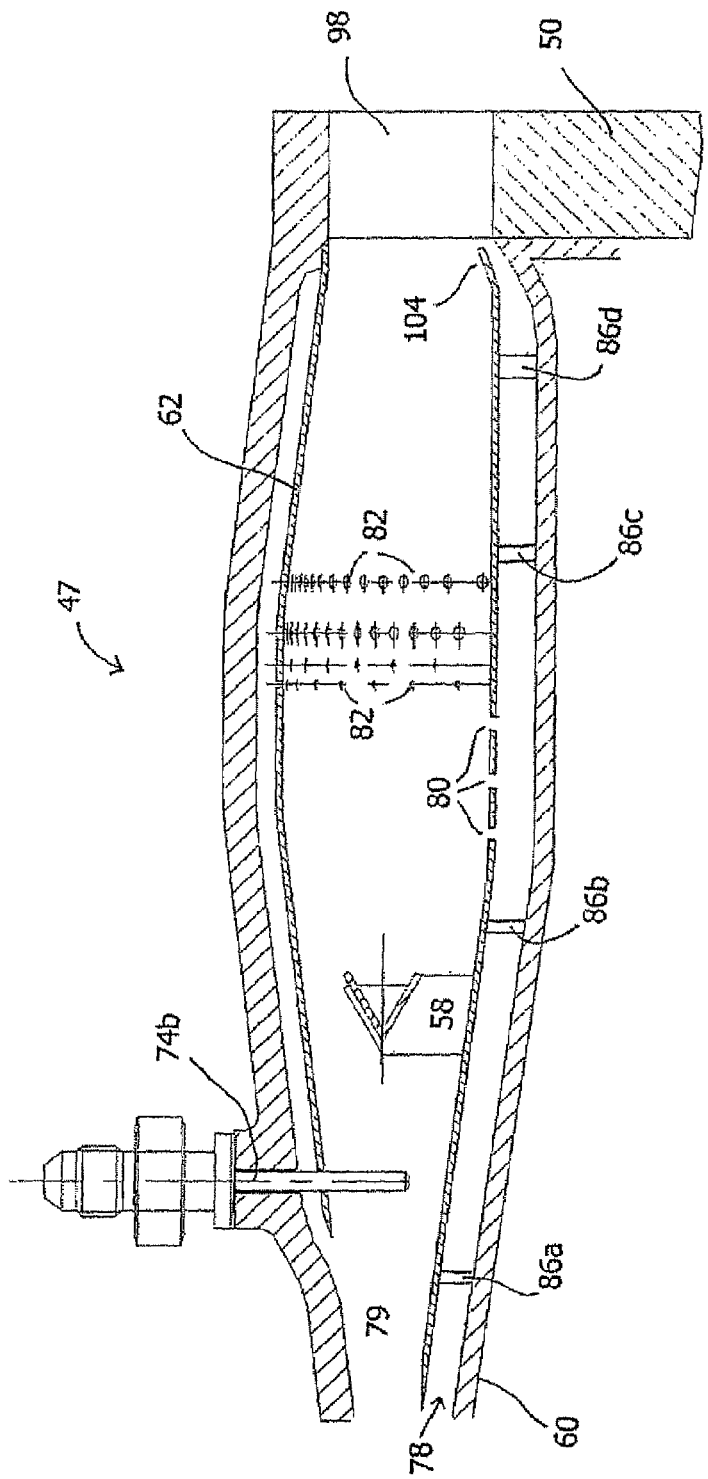
FIG. 3 is a largely cross-sectional depiction of a combustion chamber of an OCN engine having static fuel injectors located at the diffuser/combustion chamber interface.

A second preferred location to place fuel injectors in an OCN engine is in the area where the air flow vortex exits the rotating diffuser into the combustion chamber, as depicted in FIG. 3 for combustion chamber 47. The vortex at the diffuser/combustion chamber interface is an effective pre-mix zone allowing the creation of a homogenous fuel/air mixture. Such homogenous dispersion allows for the combustion of lean mixtures with relatively low $NO_X$ emission.

Rotating Fuel Injectors

In OCN engine 40 depicted in FIGS. 2, 2A and 2B fuel is directed through fuel channels 76 running through rotating shaft 52 to rotating injectors 74, emerging into combustion chamber 46 through rotating flame holders 58. OCN engines equipped with rotating injectors are generally more compact than OCN engines equipped with static injectors. Also, when rotating injectors are used, high-pressure fuel pumps are unneccessary as fuel is sprayed from the injectors by centrifugal force.

Static Fuel Injectors

Although OCN engine 40 depicted in FIGS. 2, 2A and 2B is depicted as having rotating injectors 74, an OCN engine can instead be equipped with static fuel injectors 74b, as depicted in FIG. 3.

In FIG. 3 is depicted a combustion chamber 47 of an OCN engine similar to combustion chamber 46 depicted in FIG. 2A, one significant difference being that rotating fuel injectors are replaced with static fuel injectors 74b. Static injectors 74b emerge into combustion chamber 47 at the diffuser/combustion chamber interface.

The mixing of air with fuel injected through static injectors 74b is more efficient than the mixing of air with fuel injected through rotating injectors 74 due to the airflow vortex inside combustion chamber relative to the static injectors 74b. Thus static injectors such as 74b are preferred for use in static OCN engines having large combustion chambers.

Rotating Flame Holders

In OCN engine 40 depicted in FIGS. 2, 2A and 2B as well as in combustion chamber 47 depicted in FIG. 3, primary zones are generated using rotating flame holders 58. Rotating flame holders 58 are considered part of rotating assembly 54. In some embodiments of OCN engines primary zones are generated using non-rotating flame holders (not depicted) attached to outer casing 62. The design and placement of rotating flameholders 58 or non-rotating flame holders is known to one skilled in the art. It is noteworthy that the use of flame holders is unusual in combustion chambers of turbine engines and is typically found only in ramjet engines or in the afterburner of a prior art turbine engine.

In a preferred embodiment of an OCN engine, an annular flame holder is used. The annular flame holder is described in detail hereinbelow.

Dilution and Thermal Insulation

In an OCN engine, a preferred method of exhaust gas dilution is by air injected into the combustion chamber through the inner casing or through both the the inner casing and through the outer casing.

In combustion chambers 46 depicted in FIG. 2A and 47 depicted in FIG. 3, a certain proportion of air from compressor 42 is brought through cooling channels such as 78 to emerge into combustion chamber 46 through inner casing air slots 80.

In FIG. 2A, cooling channel 78 is one of a plurality of cooling channels through inner casing 60 bringing cool air from compressor 42.

In contrast, cooling channel 78 of combustion chamber 47 depicted in FIG. 3 is defined by a space formed between inner casing 60 and a tubular element 79. Tubular element 79 is disposed surrounding and coaxial with inner casing 60, and is rigidly connected thereto by four rings of struts 86a, 86b, 86c and 86d. Struts 86a, 86b, 86c and 86d are positioned so as to define, together with tubular element 79, a "combustion chamber compressor" discussed in detail hereinbelow.

The advantage of dilution air injected through inner casing air slots 80 is twofold. First, since inner casing air slots 80 are rotating, air injected therethrough has angular momentum and thus does not disturb the air flow vortex. Second, the colder, and thus denser air, injected through inner casing air slots 80 is carried outwards by centrifugal forces towards outer casing 62. Dilution air is effectively mixed with exhaust.

Outer Casing

As noted in the introduction hereinabove, prior art turbine engines with rotating combustion chambers have rotating outer casings. The result is that the outer casing of such prior art turbine engines are subject to high hoop stresses that ultimately limit the maximal attainable rotational velocity, curtailing power output. In contrast an OCN engine does not have outer casing hoop stress. A disadvantage of the fact that the outer casing of an OCN engine does not rotate with the airflow vortex so there is flow friction typically leading to an about 2% drop in pressure in the air flow vortex. Flow friction can be reduced in an OCN engine by injecting air into the combustion chamber through openings in the outer casing to change the flow at the air flow vortex/outer casing boundary to turbulent flow. In addition, air injected through the outer casing assists in maintaining a thermally insulating air blanket. Still further, air injected through the outer casing dilutes exhaust gases.

In combustion chambers 46 depicted in FIGS. 2A and 47 depicted in FIG. 3, air is injected through outer casing air slots 82 in outer casing 62. As discussed above, such injection, reduces flow friction between the air flow vortex and the outer casing, assists in the maintenance of a thermally insulating air blanket to protect outer casing and dilutes exhaust gases.

In combustion chamber 47 depicted in FIG. 3, it is seen that the shape of the inner surface of outer casing 62, defining the outer boundary of combustion chamber 46 is, in cross section, convex outward. The convex outward cross section is effective in trapping cool air injected through inner casing air slots 80 that is brought by centrifugal forces to outer casing 62. In such a way, a self-replenishing thermally insulating air blanket is formed in order to prevent overheating of outer casing 62.

Inner Casing with Annular Flame Holder

Figure 4:
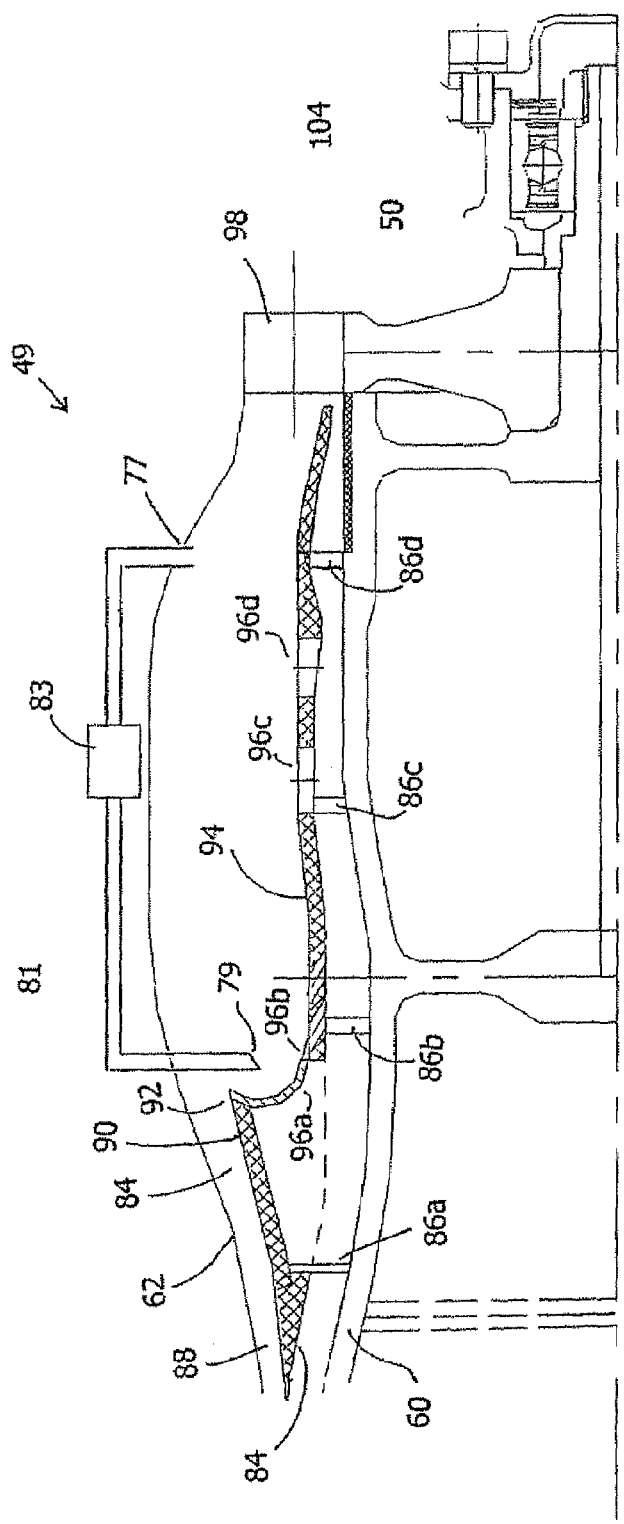
FIG. 4 is a largely cross-sectional depiction of a combustion chamber of an OCN engine with an annular flame holder and exhaust reinjection.

In FIG. 4 is depicted a combustion chamber 49 of an OCN engine similar to combustion chamber 46 of OCN engine 40 depicted in FIG. 2A. One significant difference is that rotating flame holder 58, cooling channels 78 and inner casing slots 80 of combustion chamber 46 depicted in FIG. 2A are replaced with an annular flame holder 84 in combustion chamber 49. Annular flame holder 84 (hatched) combines the functions of a flame holder and dilution effecting element in a one structurally simple yet highly effective component. In addition, annular flame holder 84 allows for effective cooling of compressor driving nozzle wheel 50, as discussed in detail hereinbelow. Annular flame holder 84 is substantially a tubular structure attached to inner casing 60 by a plurality of struts 86. The leading edge 88 of annular flame holder 84 is aerodynamic so as not to cause turbulence or shock waves in the airflow vortex. From leading edge 88 the cross-section of annular flame holder 84 comprises a first leg 90 which ends at a step 92. From step 92 the cross-section of annular flame holder 84 continues with a second leg 94. In short, the cross-section of annular flame holder 84 is roughly a harpoon or Z-shape.

The presence of annular flame holder 84 in the airflow vortex divides airflow into two different airflows, a first outer airflow between annular flame holder 84 and outer casing 62 and a second inner airflow between annular flame holder 84 and inner casing 60. Although the ideal ratio of air flow diverted to the inner airflow and outer airflow is dependent on many factors, it is currently believed that between 25% and 35% of the total airflow is preferably directed to the outer airflow.

The presence of step 92 in annular flame holder 84 in the airflow generates a volume of air that is relatively slow moving in the axial direction and consequently acts as a primary zone in combustion chamber 46.

Disposed through annular flame holder 84 are a plurality of passages or perforations 96 configured so as to allow air to pass from the inner airflow through annular flame holder 84 and to merge with the outer airflow, especially in the primary zone and in the dilution zones. The size, shape and distribution of passages or perforations 96 is chosen so as to allow efficient cooling of annular flame holder 84 as well as to allow efficient mixing and dilution of the primary and secondary zones during combustion. In a preferred embodiment, not all of the inner airflow is allowed to merge with the outer airflow through annular flame holder 84 but rather a significant portion is allowed to pass beyond the aft end of annular flame holder 84 for effective cooling of compressor driving nozzle wheel 50, as discussed in detail hereinbelow.

Specifically, depicted in FIG. 4 are two types of perforations through annular flame holder 84.

The first type of perforations, 96a and 96b are of a size, shape and direction through annular flame holder 84 so as to leak air from inner airflow substantially parallel to second leg

94. In such a way, second leg 94 is insulated from heat generated by fuel combustion in the primary zone by a film of air flowing through perforations 96a and 96b.

The second type of perforations, 96c and 96d are of a size, shape and direction through annular flame holder 84 so as to leak air from the inner airflow to both dilute the outer airflow and to form a thermally insulating film of cool air in contact with and flowing in parallel to second leg 94. Importantly, the location of perforations 96c and 96d is such that the dense cool air from inner airflow, that does not mix with air from outer airflow, is carried by centrifugal forces to the inner surface of outer casing 62. In such a way, a continuously replenished insulating cold air layer is formed along the inner surface of outer casing 62, as discussed hereinabove for combustion chamber 46 depicted in FIG. 2A.

One skilled in the art recognizes that when using an annular flame holder as described hereinabove the thermal gradient generated perpendicular to the engine axis is close to ideal. In proximity to mechanical structure, that is annular flame holder 84 and outer casing 62, the air is relatively cool. In contrast, in the center of the primary zone the air is hot Struts 86 are radially arranged in sets, each set arrayed as a ring of substantially parallel struts about inner casing 60. Struts 86 preferably have an airfoil shape to minimize pressure losses. Struts 86 serve four primary purposes.

The first primary purpose of struts 86 is structural, to hold annular flame holder 84 in place.

The second primary purpose of struts 86 is to generate an insulating blanket of cool air to prevent migration of the flame from the primary zone to inner casing 60.

In an OCN engine, the airflow vortex generates a radial static pressure gradient inside the combustion chamber that increases towards the outer casing. One effect of this gradient is that under certain conditions there is a back flow of hot exhaust air from the proximity of compressor-driving nozzle wheel, along the inner casing, towards the front of the engine. Thus, the third primary purpose of struts 86 is to prevent back flow, resulting from the airflow vortex in an OCN engine, from compressor-driving nozzle wheel 50 along inner casing 60. A preferred method of achieving this is that some of struts 86 are angled in such a way so as to substantially define a compressor in combustion chamber 49. This combustion chamber compressor increases the pressure of the inner air flow, preventing backflow from compressor-driving nozzle wheel 50.

The fourth primary purpose of struts 86, related to the third primary purpose, is to increase the pressure of the inner airflow so as to improve the dilution of the primary zone. Although dilution from the inner airflow is assisted by centrifugal forces and the greater density of the cool air making up inner airflow, dilution is even more effective as a result of the combustion chamber compressor.

In combustion chamber 49 of an OCN engine depicted in FIG. 4, struts 86 are arranged in four rings. Struts 86a of the first ring are vane shaped and positioned at an angle of from about 30° to about 50° from parallel with the engine axis. Struts 86b of the second ring are vane shaped and positioned at an angle of about 10° to about 20° from parallel with the engine axis. Thus, struts 86a and 86b implement the concept of the combustion chamber compressor. Struts 86c of the third ring and struts 86d of the fourth ring, having primarily a structural function, are vane shaped and substantially parallel to the engine axis.

Figure 5:
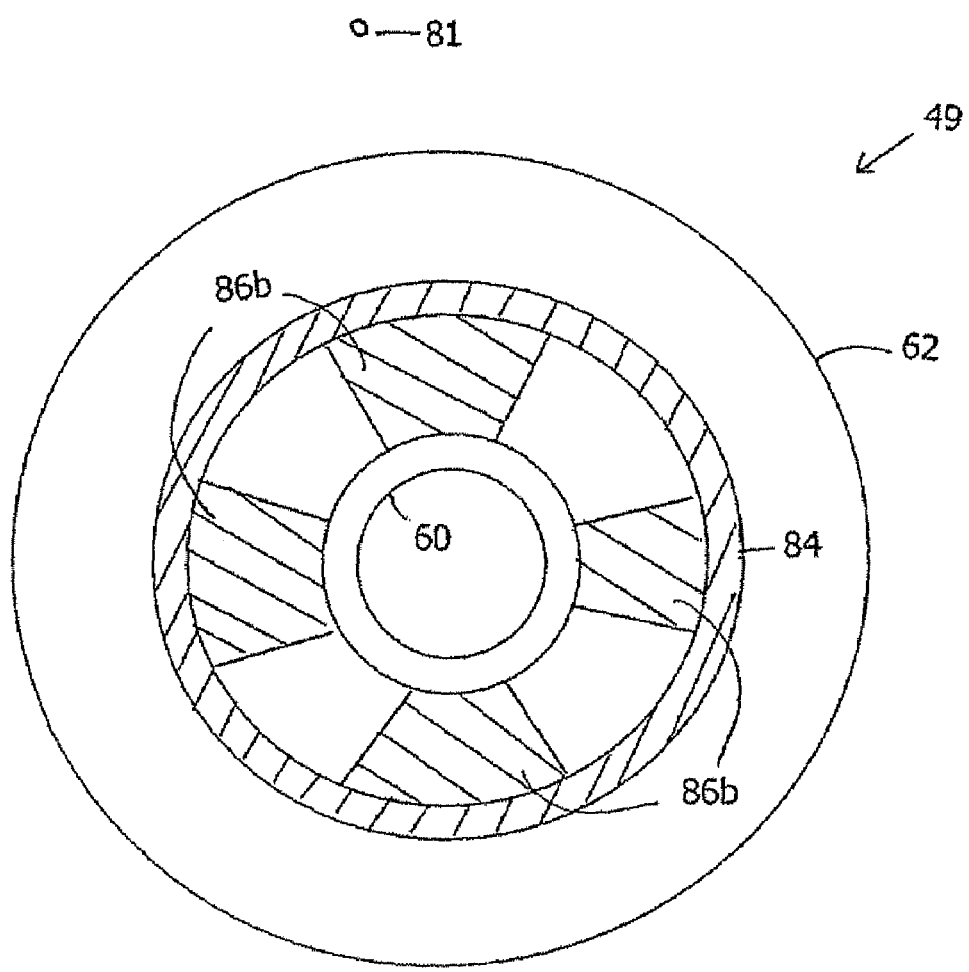
FIG. 5 is a transverse cross-section of an OCN engine depicting a combustion chamber compressor.

In FIG. 5 a transverse cross-section perpendicular to the axis of combustion chamber 49 through struts 86b, also depicted in FIG. 4. It is seen that struts 86b attach annular flame holder 84 to inner casing 60. Further it is seen that struts 86b are positioned at an angle from the axis of the engine. In such a way, inner casing 60, struts 86b and annular flame holder 84 define a combustion chamber compressor.

One skilled in the art recognizes that engine types other than OCN engines may also suffer from axial backflow. It will be clear to one skilled in the art, upon reading the description of a combustion chamber compressor hereinabove, how to overcome the difficulties caused by axial backflow in other types of engine by implementing, with the appropriate modifications, the teachings herein.

A design issue that must be addressed when implementing an annular flame holder, such as 84, in an OCN engine is the hoop stress to which an annular flame holder is subject. First, it is important to remember that the small radius of an annular flame holder means that hoop stresses are inherently low. Further, since an annular flame holder is generally a small-one piece component supported by radial struts to an inner casing, problems associated with hoop stresses can be avoided at reasonable cost by fashioning the annular flame holder robustly and from rigid materials such as super alloy metals or ceramic materials.

Exhaust Reinjection

In the art, the reinjection of exhaust gases into the primary zone to reduce oxygen content and consequently $NO_X$ emissions is well known. In an OCN engine, exhaust reinjection is simple to achieve due to the fact that the radial static pressure gradient inside the combustion chamber increases towards the outer casing.

In FIG. 4 exhaust reinjection is depicted for an OCN engine. Exhaust reinjection inlet 77 in outer casing 62 is found upstream of compressor-driving nozzle wheel 50. Exhaust reinjection outlet 79 is found in proximity of the primary zone generated by annular flame holder 84, and preferably as close as possible to inner casing 60. Exhaust reinjection outlet 79 and exhaust reinjection inlet 77 are in communication through exhaust reinjection pipe 81 allowing the flow of gases from exhaust reinjection inlet 77 to exhaust reinjection outlet 79. The part of exhaust reinjection pipe 81 that extends into combustion chamber 46 has an aerodynamic shape so as not to cause turbulence in the airflow vortex inside combustion chamber 46. Exhaust reinjection pipe 81 passes through valve 83, valve 83 configured to regulate exhaust reinjection if desired.

When it is desired to perform exhaust reinjection, valve 83 is opened. Due to the fact that exhaust reinjection inlet 77 is far from the engine axis where static pressure is high whereas exhaust reinjection outet 79 is close to the engine axis where static pressure is low, oxygen-poor exhaust flows through exhaust reinjection pipe 81 into the primary zone of combustion chamber 46.

Torque Section: Compressor-Driving Nozzle Wheel

Turbines of prior art turbine engines, such as 10, comprise one or more stages. Each stage comprises a non-rotating nozzle wheel having a plurality of radially disposed nozzle guide vanes 30 and a turbine wheel 20 having radially disposed turbine blades 32. Nozzle guide vanes 30 direct air flowing emerging from combustion chambers 12 at an acute angle, typically in the range of 25° to 35° from parallel with the engine axis. Turbine blades 12 have an impulse, reaction or impulse-reaction airfoil cross-section. Although these cross-sections are necessary for efficient turbine operation, a significant amount of energy is lost due to suction generated on one face of the airfoil and pressure generated on the other face of the airfoil resulting in secondary flows between any two adjacent blades. More significantly, the cross-section of the turbine blade necessitates that the airflow along the vanes be subsonic to prevent the generation of supersonic shock waves at the leading and trailing edges. The requirement for subsonic flow limits turbine pressure ratio and increases engine complexity when multistage turbines are required. For example, in a typical prior art turbine engine having 25 bar pressure in the combustion chamber, each stage of the turbine must have a pressure ratio limit of about 2.5-3.0 in order to avoid supersonic flow. Such a typical engine must therefore have 3 stators and 3 turbines with the inherent high complexity and concomitant expense.

In contrast, an OCN engine such as OCN engine 40 depicted in FIG. 2 has neither a turbine wheel nor a non-rotating nozzle wheel, but rather a compressor-driving nozzle wheel 50 that is part of rotating assembly 54. Compressor-driving nozzle wheel 50 is substantially a plurality of nozzle wheel blades 98 radiating outwards from a hub attached to rotating shaft 52. FIG. 6A is an axial cross section of a compressor-driving nozzle wheel 50 depicting three blades 98 and two nozzles 102. As is seen in FIG. 6A, the space between two adjacent nozzle wheel blades 98 defines a nozzle 102. Nozzle 102 preferably has a converging-diverging shape.

Since in an OCN engine, such as OCN engine 40, produces torque without a turbine, the exit angle of nozzles 104 can be virtually any angle between close to 0° (parallel to the engine axis) or close to 90° (perpendicular to the engine axis). As is clear to one skilled in the art, when it is desired to produce more thrust, the exit angle of nozzles 104 is generally smaller (closer to parallel to the engine axis) so that the velocity of gas jets emerging from nozzles 104 have a significant axial component. In contrast, when it is desired to produce more torque, the exit angle of nozzles 104 is preferably greater (closer to perpendicular to the engine axis) and, in principle, can be as close as possible to perpendicular to the engine axis. In such a way, a maximal amount of torque is produced.

In FIG. 6A, nozzle wheel blades 98 are positioned so that the exit angle of gas jets exiting nozzles 102 is 82° from parallel with the engine axis (the drawing is exaggerated for clarity).

During OCN engine operation, the airflow vortex rotates together with compressor-driving nozzle wheel 50 and nozzle wheel blades 98 and expands through nozzles 102. The gas accelerates to an exit velocity which depends on compressor-driving nozzle wheel 50 back pressure. Due to the converging-diverging shape of nozzle 102 the velocity may be supersonic in the relative flow while the absolute exit velocity remains subsonic. In such a way pressure losses are minimized while expansion efficencies are maximized.

Cooling of Compressor-Driving Nozzle Wheel

One of the weak points of a prior art turbine engines, such as 10, is that due to the extreme thermal and mechanical stresses, turbine blades often break at the base. One preferred solution to reduce turbine blade stress involves passing cool air through cooling channels running inside the blades and emerging through pores on the blade surface. Such cooled turbine blades increase the complexity and cost of a turbine engine, as well as reduce net turbine efficiency due to the air which cools the blades but is not used for expansion through the turbine.

In U.S. Pat. No. 6,272,844 a method of cooling turbine blades is taught whereby a rotating bladed disk attached to a rotating turbine centrifugally pushes air from a compressor through multiple passages facing each turbine blade, enveloping each blade with cool air.

In an OCN engine, due to the fact that nozzle wheel blades are rotating together with the inner casing as part of the rotating assembly, efficient cooling of nozzle wheel blades can be achieved, as described hereinbelow.

In the OCN engine depicted in FIG. 3, air to cool nozzle wheel blades 98 is brought to blade cooling nozzles 104 through cooling channels 78. In OCN engines having an annular flame holder, such as depicted in FIG. 4, air to cool nozzle wheel blades 98 is brought to blade cooling nozzles 104 by directing a part of the inner-air flow to blade cooling nozzles 104.

In FIG. 3 and FIG. 4, cool air emerges from each blade cooling nozzle 104 directly at the base of a corresponding nozzle wheel blade 98, as depicted in FIG. 6A and FIG. 6B. FIG. 6B shows further details of the cooling of the base of a blade 98 of a compressor-driving nozzle wheel 50 according to the method of the present invention in cross section in a cylindrical plane that is coaxial with the axis of an OCN engine.

Beyond just cooling the base of a corresponding nozzle wheel blade 98, the dense cool air emerging from blade cooling nozzles 104 is carried by centrifugal forces as a film along nozzle wheel blade 98, giving a cooling effect along a significant length of nozzle wheel blade 98. Thus, whereas in prior art cooled turbine blades cooling efficacy is limited by factors such as flow through the cooling passages, pore location and geometry, blade cooling as described hereinabove creates an insulating blanket of air starting at the hottest part of a blade, the leading edge. In addition, when blade cooling is performed according to the teachings of the present invention, the cooling air is not heated as it passes through the turbine disk and the cooling passages, as occurs when prior art cooled turbine blades are used.

As discussed previously, one skilled in the art recognizes that under certain OCN engine operating conditions the airflow vortex generates an axial pressure gradient sufficient to cause backflow from the proximity of torque-section 48 along the surface of inner casing 60. In combustion chambers such as 47 depicted in FIG. 3 or 49 depicted in FIG. 4, such backflow reduces the efficacy of cooling by preventing cool air from emerging through cooling nozzles 104. It is thus necessary to increase the pressure of air emerging through cooling nozzles 104. To this end, a combustion chamber compressor is provided.

In combustion chamber 49 depicted in FIG. 4 struts 86a and 86b are positioned in a manner, as discussed above, so that together with annular flame holder 84 a combustion chamber compressor exists. Rotation of inner casing 60 as part of rotating assembly 54 also causes the rotation of struts 86a and 86b as well as annular flame holder 84, increasing the pressure of the inner air flow and the pressure of air emerging through blade cooling nozzles 104.

Analogously, in combustion chamber 47 depicted in FIG. 3 struts 86a and 86b are positioned in the manner discussed above, so that struts 86a and 86b together with tubular element 79 and inner casing 60 define a combustion chamber compressor. Rotation of inner casing 60 as part of rotating assembly 54 also causes the rotation of struts 86a, 86b and tubular element 79, increasing the pressure of the air emerging through blade cooling nozzles 104.

It is clear that the cooling of a nozzle wheel blade as described allows the operating temperature of an OCN engine to be significantly higher then prior art engine turbine engine designs. Higher operating temperatures allows greater engine efficiency.

One skilled in the art realizes that the cooling OCN engine nozzle wheel blades as taught herein can be implemented, with appropriate modification, to prior art turbine engines or other devices where a bladed rotating wheel is attached to a rotating axle. Implementation substantially involves forcing a cooling fluid through channels substantially parallel to and rotating with the axle, to emerge through openings in proximity of the base of each individual blade of the bladed rotating wheel.

Free Nozzle Wheel

If the cycle pressure ratio of a given OCN engine is too high to be efficiently utilized using a single compressor-driving nozzle wheel (calculated to be in the order of 6:1) a second contra-rotating free nozzle wheel is used. No stationary guide vanes are required between the two nozzle wheels. Functionally, a free-nozzle wheel acts analogously to a free turbine in prior art turbine engines. It is important to note, however that an OCN engine free nozzle wheel is significantly more efficient than a prior art turbine engine free turbine. The greater efficiency is due to the fact that for reasons analogous to those discussed for the compressor driving nozzle wheel of an OCN engine, the nozzle angles of a free nozzle wheel are significantly greater than those of the analogous free turbine blades.

Figure 7:
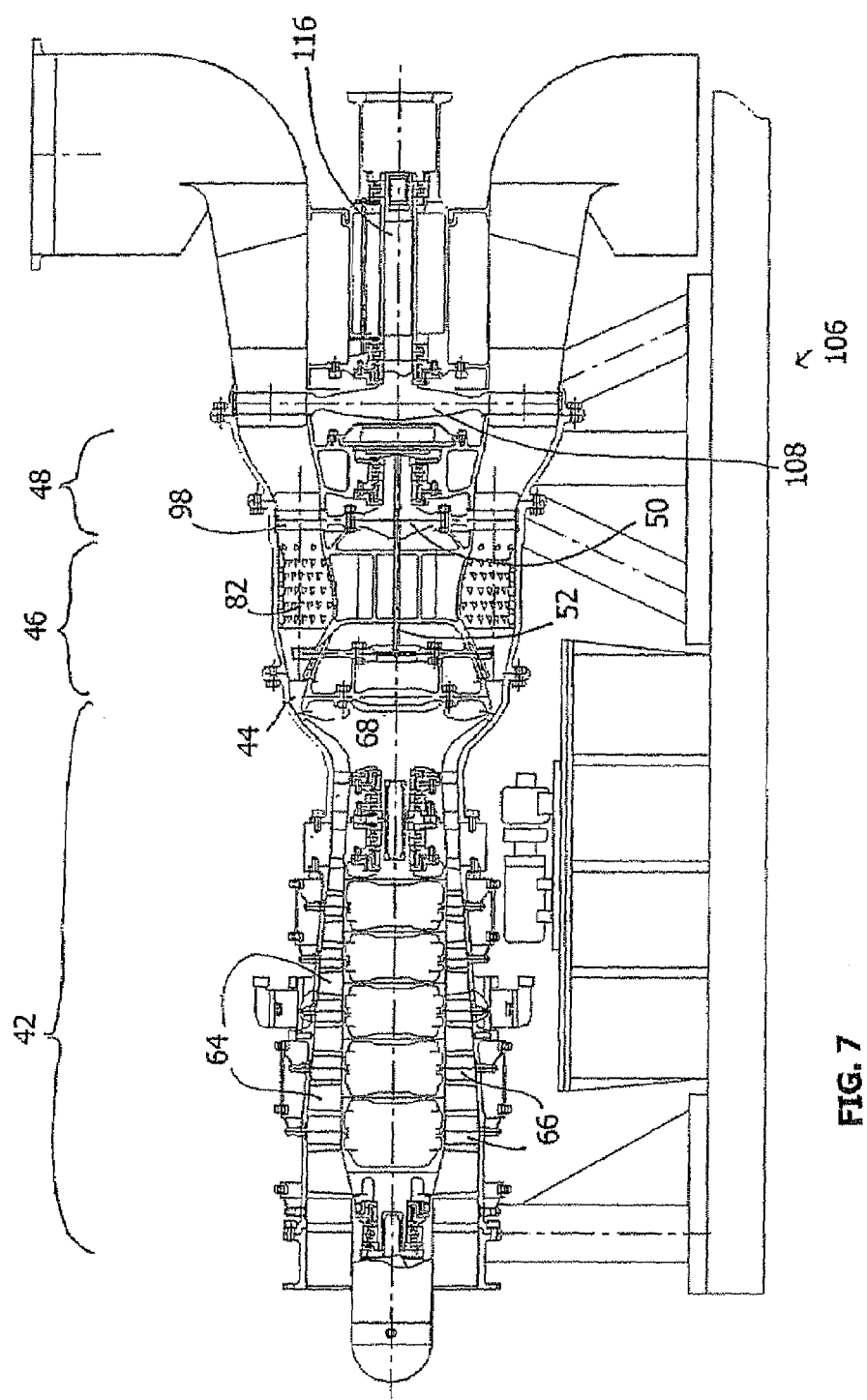
FIG. 7 is a largely cross-sectional depiction of an embodiment of a turboshaft embodiment of an OCN engine having a free-nozzle wheel to drive the load.

In FIG. 7 is depicted a turboshaft embodiment of an OCN engine 106, similar to turbojet OCN engine 40 depicted in FIG. 2. Amongst other differences, in torque section 48 of OCN engine 106 there is a free-nozzle wheel 108 in addition to compressor-driving nozzle wheel 50. As is clear to one skilled in the art, not only is such a design compact and efficient, but is able to handle a cycle pressure ratio of up to about 24:1 with only two expansion stages.

An advantage of the contra-rotation of the two nozzle wheels, 50 and 108 is that gyroscopic forces are reduced. The possibility of reducing gyroscopic forces makes a two-nozzle wheel OCN engine exceptionally useful for the propulsion of light aircraft.

Partial Admission

Often a low-power but efficient turbine engine is required. Such engines require a high pressure ratio with a low mass flow having narrow flow passageways where boundary layer interactions cause a significant loss of efficiency.

An alternative known in the art is to reduce the power output of a large turbine engine by blocking some of the turbine nozzle vanes in order to reduce flow. Although power output is reduced, efficiency is also dramatically worsened, due to the drag caused by non-used turbine blades.

In contrast, partial admission is applied to an OCN engine to reduce power without affecting efficiency.

Figure 8:
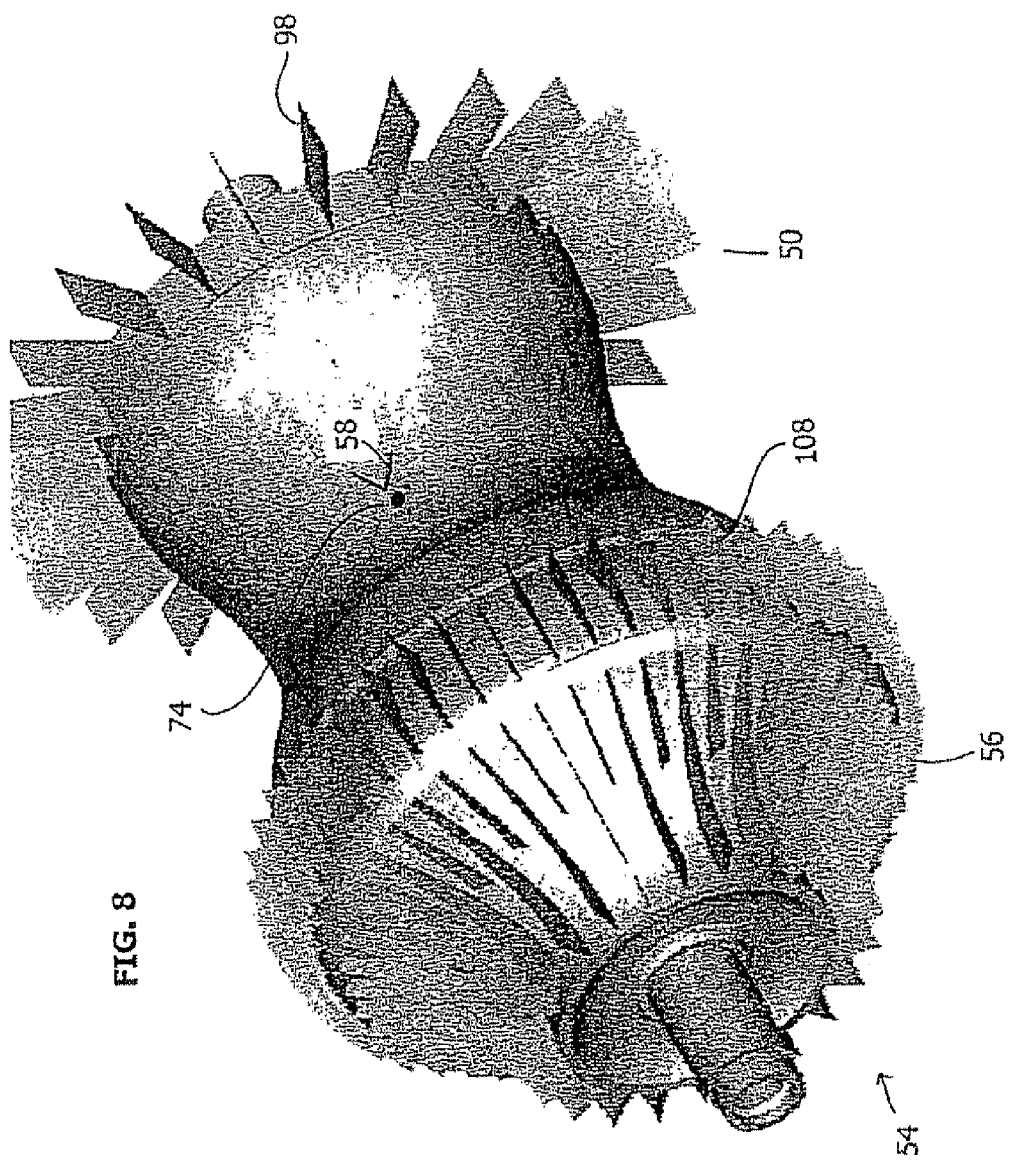
FIG. 8 is a perspective view of a schematic depiction of a rotating assembly of an OCN engine configured for partial admission.

In FIG. 8, a rotating assembly 54 of an OCN engine is depicted where the gap surface area of both compressor wheel 56 and compressor-driving nozzle wheel 50 are blocked by, for example, attaching a cover so as to block the space between some of compressor blades 108 and nozzle wheel blades 98 (in FIG. 8, the hatched markings). Although through-flow and power output is reduced at each stage, the OCN engine continues to function at a maximal efficiency.

Practical Embodiments

Figure 9:
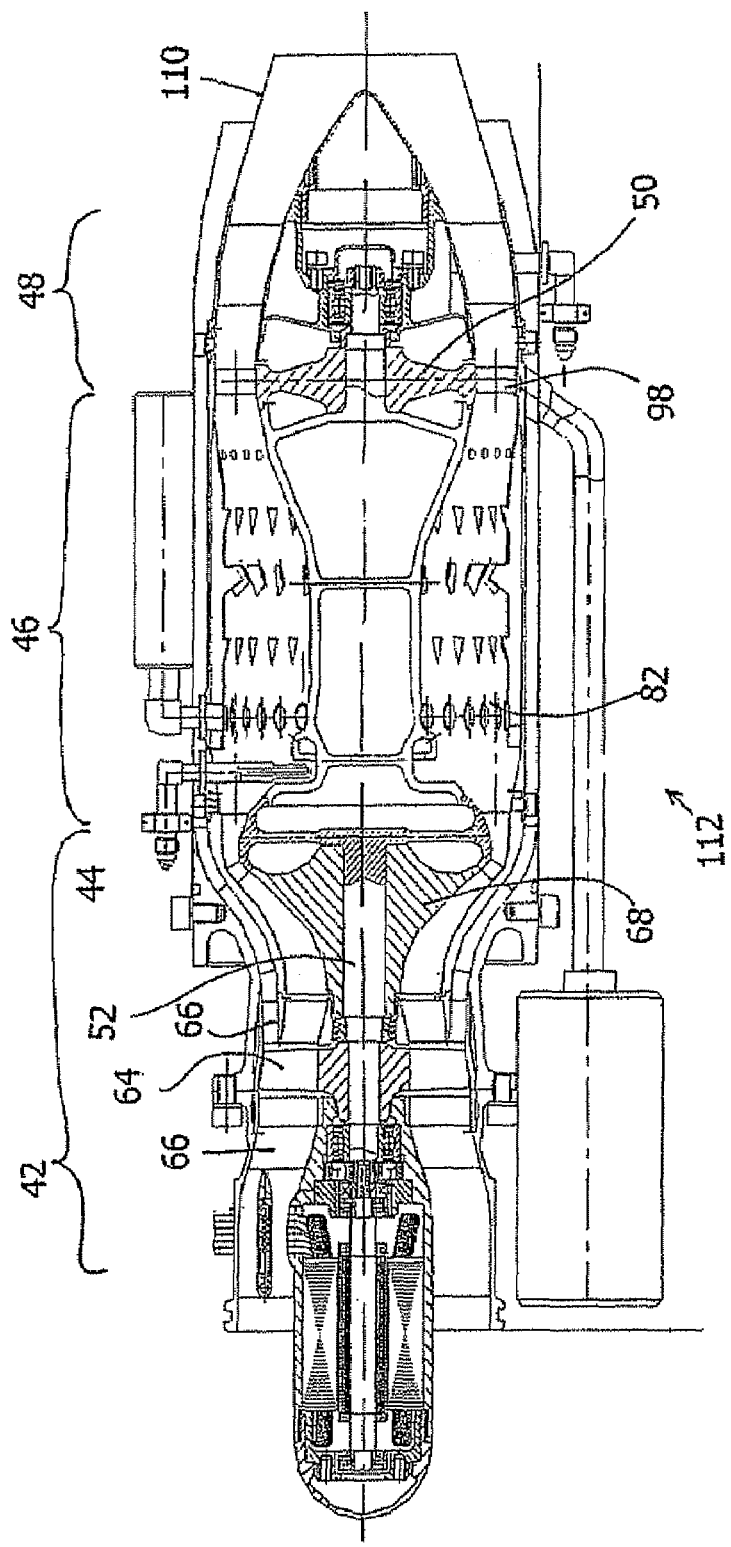
FIG. 9 is a largely cross-sectional depiction of an embodiment of a turbofan embodiment of an OCN engine.
Figure 10:
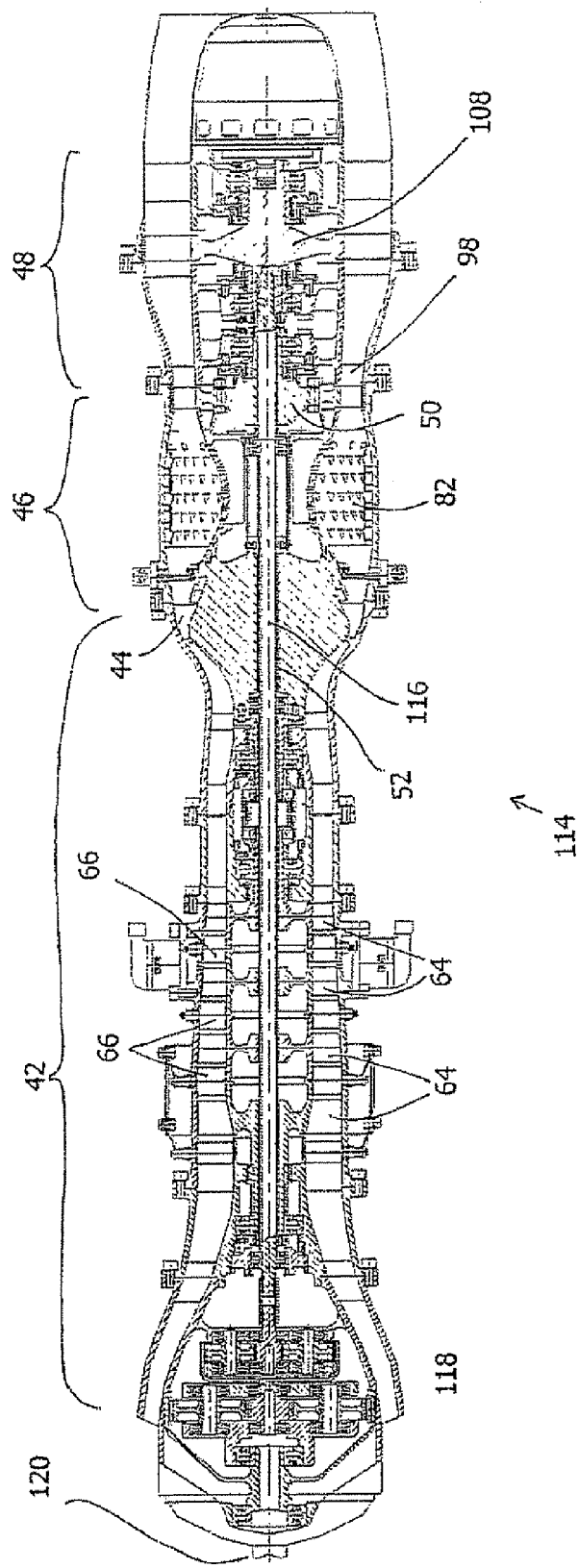
FIG. 10 is a largely cross-sectional depiction of an embodiment of a turboprop embodiment of an OCN engine.

From the description hereinabove, one skilled in the art sees that the teachings of the present invention can be utilized in making engines for many different purposes. A turbojet embodiment of an OCN engine 40 is depicted in FIG. 2 and in FIG. 7 a turboshaft embodiment 106 of an OCN engine is depicted. In FIG. 9 a turbofan embodiment 112 of an OCN engine is depicted. In FIG. 10 a turboprop embodiment 114 of an OCN engine is depicted. Like components of the four embodiments are labeled with like reference numerals. Salient differences between the various embodiments of an OCN engine are clear to one skilled in the art from study of the appropriate figures.

Amongst other details, it is important to note that OCN turbojet 40 depicted in FIG. 2 is equipped with a convergent type exhaust duct 110 to maximize thrust.

Amongst other details, it is important to note that OCN turbojet 106 depicted in FIG. 7 is equipped with free-nozzle wheel 108 to maximize torque production through torque shaft 116.

Amongst other details, it is important to note that OCN turbofan 112 depicted in FIG. 9 is equipped with a convergent type exhaust duct 110 to maximize thrust.

Amongst other details, it is important to note that OCN turboprop 114 depicted in FIG. 10 is equipped with free-nozzle wheel 108 to maximize torque production through torque shaft 116. Gears 118 are used to combine torque from torque shaft 116 and rotating shaft 52 to drive propeller shaft 120. As stated above, contra-rotation of the two nozzle wheels, 50 and 108 reduces gyroscopic forces making a two-nozzle wheel OCN engine such as 114 exceptionally useful for the propulsion of light aircraft.

Efficiency of an OCN engine

The mechanical advantages of an OCN engine over a conventional turbine engine are manifest to one skilled in the art reading the description hereinabove. However, in addition to the reduced number of components, simplicity of components and efficient cooling of these components, the theoretical thermodynamic efficiency of an OCN turbine engine is greater than that of a conventional prior art turbine engine (due to the elimination of stators in the compressor and the turbines) primarily along the inlet and exhaust legs of the thermodynamic cycle. A detailed discussion of the thermodynamic cycle of an OCN engine is found in the appendix attached hereto.

While the OCN engine has been described with respect to a limited number of embodiments, it will be appreciated that many variations, modifications and other applications of the OCN engine may be made.

What is claimed is:

1. An engine, comprising:
    a. a rotating assembly including a primary compressor, an inner casing and a compressor-driving nozzle wheel;
    b. an outer casing, enclosing said rotating assembly; and
    c. a substantially annular flame holder encircling said inner casing within said combustion chamber;
 so that at least one combustion chamber is defined in the space between said primary compressor, said inner casing, said compressor-driving nozzle wheel and said outer casing, characterized in that said outer casing does not rotate with said rotating assembly; and wherein the engine further comprises:
    d. a substantially tubular element surrounding said inner casing, wherein a leading edge of said tubular element is positioned aft of said primary compressor so as to divide airflow from said primary compressor into only an outer airflow and an inner airflow, wherein said outer airflow is only between said tubular element and said outer casing and wherein said inner airflow is only between said tubular element and said inner casing.

2. The engine of claim 1, wherein said flame holder is at least a portion of said substantially tubular element.

3. The engine of claim 1, further comprising:
    e. a combustion chamber compressor, coaxial with and radially inward from one of said at least one combustion chamber, said combustion chamber compressor being configured to counteract axial backflow in said one combustion chamber.

* * * * *

UNITED STATES PATENT AND TRADEMARK OFFICE
CERTIFICATE OF CORRECTION

| | |
|---|---|
| PATENT NO. | : 7,404,286 B2 |
| APPLICATION NO. | : 10/518767 |
| DATED | : July 29, 2008 |
| INVENTOR(S) | : David Lior |

It is certified that error appears in the above-identified patent and that said Letters Patent is hereby corrected as shown below:

Column 16, Line 38, Insert The Following Text: (Attached)

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

OCN - Orbiting Combustion Nozzle Engine

Table of contents

I    Abstract
II   Nomenclature
1.   Introduction
2.   Description
3.   Thermodynamic Cycle Analysis
4.   Performance analysis
5.   Conclusions OCN performance calculation
    Fig 1.: OCN - Cross sections of Turbo-shaft version
    Fig 2.: T-S Diagram
    Fig 3.: OCN - Thermal efficiencies vs. Compressor pressure ratio
    Fig 4.: OCN - Specific Power vs. Compressor pressure ratio
    Fig 5.: OCN and conventional gas turbine Specific power - comparison
    Fig 6.: OCN and conventional gas turbine efficiencies - comparison
    Fig 7.: OCN Turbofan - S.F.C. vs. Turbine temperature
    Fig 8.: OCN Turbofan - Thrust vs. Turbine temperature
    Fig 9.: OCN - Effect of Part Load on Thermal Efficiency
    Fig 10.: OCN - Effect of Part Load on Power
    Fig 11.: OCN - Velocity Triangles Signed and Sealed this Twenty-third Day of September, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,404,286 B2 |
| APPLICATION NO. | : 10/518767 |
| DATED | : July 29, 2008 |
| INVENTOR(S) | : David Lior |

It is certified that error appears in the above-identified patent and that said Letters Patent is hereby corrected as shown below:

Title Page, illustrating a Figure, should be deleted, and replaced showing 19 Drawing Sheets.

Column 6, line 19, add

Fig 11 are OCN-Cross sections of Turbo-shaft version;

Fig 12 is a T-S Diagram;

Fig 13 shows OCN-Thermal efficiencies vs. Compressor pressure ratio;

Fig 14 shows OCN-Specific Power vs. Compressor pressure ratio;

Fig 15 is an OCN and conventional gas turbine Specific power-comparison;

Fig 16 is an OCN and conventional gas turbine efficiencies-comparison;

Fig 17 shows OCN Turbofan-S. F. C. vs. Turbine temperature;

Fig 18 shows OCN Turbofan-Thrust vs. Turbine temperature;

Fig 19 shows an OCN-Effect of Part Load on Thermal Efficiency;

Fig 20 shows an OCN-Effect of Part Load on Power; and

Fig 21 shows OCN-Velocity Triangles.

Signed and Sealed this

Fifteenth Day of September, 2009

David J. Kappos
*Director of the United States Patent and Trademark Office*

(12) United States Patent
Lior

(10) Patent No.: US 7,404,286 B2
(45) Date of Patent: Jul. 29, 2008

(54) ORBITING COMBUSTION NOZZLE ENGINE

(75) Inventor: David Lior, Herzeliya (IL)

(73) Assignee: R-Jet Engineering Ltd., Herzeliya (IL)

(*) Notice: Subject to any disclaimer, the term of this patent is extended or adjusted under 35 U.S.C. 154(b) by 537 days.

(21) Appl. No.: 10/518,767

(22) PCT Filed: May 26, 2003

(86) PCT No.: PCT/IL03/00434

§ 371 (c)(1),
(2), (4) Date: Dec. 21, 2004

(87) PCT Pub. No.: WO2004/003357

PCT Pub. Date: Jan. 8, 2004

(65) Prior Publication Data

US 2005/0235648 A1   Oct. 27, 2005

(51) Int. Cl.
F02C 3/14 (2006.01)
F02C 3/34 (2006.01)
F02C 7/18 (2006.01)

(52) U.S. Cl. .............. 60/39.35; 60/39.34; 60/726; 60/750

(58) Field of Classification Search .......... 60/750, 60/806, 39.34, 39.35, 726
See application file for complete search history.

(56) References Cited

U.S. PATENT DOCUMENTS

| | | | |
|---|---|---|---|
| 2,465,856 A | 3/1949 | Emigh | |
| 2,499,863 A | 3/1950 | Hart | |
| 2,594,629 A | 4/1952 | Exner | |
| 2,784,551 A * | 3/1957 | Karlby et al. | 60/39.35 |
| 2,793,496 A * | 5/1957 | Mortimer | 60/39.35 |
| 3,200,588 A | 8/1965 | Math | |
| 3,557,551 A | 1/1971 | Campbell | |
| 4,226,087 A * | 10/1980 | Spadaccini | 60/749 |
| 4,368,619 A * | 1/1983 | Levesque | 60/39.35 |
| 4,897,995 A * | 2/1990 | Guirguis | 60/39.35 |
| 5,782,079 A * | 7/1998 | Chiang et al. | 60/804 |
| 5,927,076 A * | 7/1999 | Pillsbury | 60/749 |
| 6,272,844 B1 | 8/2001 | Rakhmailov | |
| 6,295,802 B1 | 10/2001 | Lior | |
| 6,460,343 B1 | 10/2002 | Rakhmailov | |
| 6,474,070 B1 * | 11/2002 | Danis et al. | 60/754 |

OTHER PUBLICATIONS

NACA Research Memorandum; Weight-flow and thrust limitations due to the use of rotating combustors in a turbojet engine by Lexberg et al. Aug. 1956—National Advisory Committee for Aeronautics.

* cited by examiner

*Primary Examiner*—Ted Kim
(74) *Attorney, Agent, or Firm*—Mark M. Friedman

(57) ABSTRACT

An orbiting combustor nozzle (OCN) engine, having a rotating assembly comprising a co-rotating compressor and nozzle wheel enclosed within a non-rotating outer casing, defining a rotating combustion chamber, is disclosed. Combustion occurs in the combustion chamber in a vortex of gas that rotates at the same angular velocity as the rotating assembly. Also disclosed, is a method of cooling a blade of a rotating wheel, such as a turbine wheel or nozzle wheel, by projecting cool air at the base of the vane form a nozzle corotating with the blade. Such cooling is easily implemented in an OCN engine with use of an innovative annular combustor. Also disclosed is a method of countering axial backflow by use of a combustion chamber compressor.

3 Claims, 19 Drawing sheets

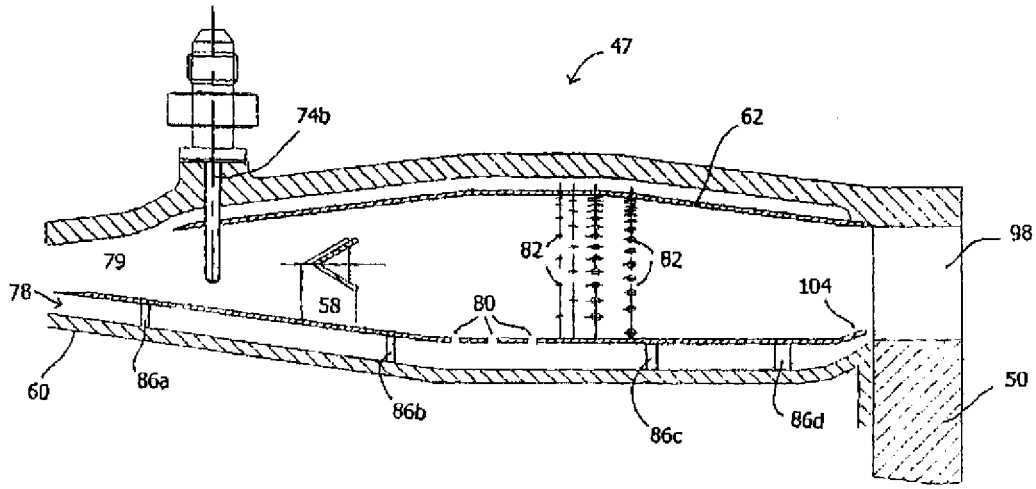

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

Column 16, line 38, add

A new concept of an orbiting combustion nozzle (OCN) engine is presented in which the power is provided by a rotating combustion chamber expanding through rotating nozzles, generating a continuous torque and rotating together as one unit. The air is supplied to the combustion chamber from a compressor rotating with the combustion chambers in the same angular velocity, eliminating the conventional stationary compressor diffuser and turbine nozzle guide vanes. A compact engine is thus attained, having the low pollution and continuous combustion advantages of a gas turbine with fewer components and more cost effective.

A thermodynamic analysis results in specific power and thermal efficiencies higher than those of conventional gas turbines while using combustion STATIC temperature lower by $140°K$ than contemporary gas turbines. The significance of this on emission and reliability is self-evident.

Also, the part load performance of this engine is superior to a conventional cycle gas turbine which is a great advantage in many applications.

II. Nomenclature $C_p$ - specific heat at constant pressure $C_{\bar{p}}$ - average value for the progress range $C$ - absolute velocity $C_v$ - specific heat at constant volume $E$ - energy input $F_r$ - reaction force $k$ - $C_p/C_v$ $m$ - mass flow $M$ - Mach number $P$ - pressure $P.R$ - pressure ratio $R$ - universal gas constant $T$ - temperature $u$ - orbital velocity $w$ - relative velocity

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

Suffixes -

| | | |
|---|---|---|
| a | - | ambient |
| c | - | compressor |
| e | - | exit |
| d | - | diffuser |
| is | - | isentropic |
| n | - | nozzle |
| R | - | relative |
| s | - | static condition |
| th | - | thermal |
| t | - | total stagnation condition |
| u | - | tangential component of velocity |
| x | - | actual conditions at nozzle outlet |
| 2 | - | compressor outlet conditions |
| 3 | - | nozzle inlet conditions |
| 4 | - | nozzle outlet conditions |

Greek

| | | |
|---|---|---|
| η | - | efficiency |
| ρ | - | gas density |
| Δp | - | combustion chamber pressure loss |

1. Introduction

In a conventional gas turbine cycle, air is compressed by a compressor rotor and its dynamic energy at the compressor exit is diffused by a stationary diffuser. This diffusion creates a pressure loss of about 10% of the rotor total pressure, thus decreasing the compressor efficiency and the net work of the gas turbine.

Further, exiting the diffuser the air is introduced into the combustor in which combustion gas is expanded through the turbine to generate power. Since the combustor is stationary, the gas is accelerated again through stationary vanes to match the rotating blade inlet conditions. In doing so, there is an extra loss of total pressure and a decrease of turbine efficiency mainly due to friction losses and aerodynamic vortices in the zone between vanes and blades. Thus, turbine efficiency is impaired - reaching only 85% in small gas turbines.

The combined losses of the turbine and compressor efficiencies result in a reduced performance of the gas turbine - up to 35% reduction (for high pressure ratio cycle) in net power, compared to the OCN performance,

UNITED STATES PATENT AND TRADEMARK OFFICE
CERTIFICATE OF CORRECTION

| | | |
|---|---|---|
| PATENT NO. | : 7,404,286 B2 | |
| APPLICATION NO. | : 10/518767 | |
| DATED | : July 29, 2008 | |
| INVENTOR(S) | : David Lior | |

It is certified that error appears in the above-identified patent and that said Letters Patent is hereby corrected as shown below:

which due to its unique design eliminates the above losses.

Furthermore, to avoid losses due to shock waves, the conventional turbine is not designed to operate in supersonic inlet blade conditions, thus the pressure ratio per turbine stage is limited (about 2.5). Consequently, in conventional high pressure ratio turbines, there are several stages - stationary and rotating, while the OCN, having no inlet guide vanes and not limited to expand higher pressure ratios with a high efficiency up to 4:1 with one stage, has fewer expansion stages (turbines).

2. Description – Fig. 11

Ambient air is sucked into a compressor [1]. The air is compressed to the desired pressure and rotational speed in axial stages and then in a centrifugal stage.

Air exiting from the compressor rotor [2] is not diffused to stationary conditions but fed through rotating vanes into a rotary combustor [4] thus:

- Eliminating pressure loss as in a conventional diffuser, resulting in higher compressor efficiency, (gain of about 5% for a pressure ratio of 20:1).

- Reaching a higher pressure ratio with the same number of compressor stages compared to a conventional compressor - due to the low relative velocity of the compressor exit flow. Usually in conventional compressors, the pressure ratio is limited to avoid supersonic flow in the diffuser inlet.

Air exiting into the rotary combustor is mixed with fuel and the mixture is burnt in lower static pressure then in a conventional cycle. The swirling air helps in vaporizing the fuel. Its relative velocity is kept low by choosing carefully the compressor outlet conditions. Combustion efficiencies are designed to be between 98-99.8% and pressure drops less than 6% of the inlet relative pressure.

The hot gases are expanded now through rotary nozzles [5] which provide the energy to drive the compressor - a much less enthalpy drop is required than from a conventional turbine due to the higher expansion efficiency in the rotating nozzles. No stationary vanes are needed to expand the hot gas from stagnation conditions into rotating blades. This results in:

- A high adiabatic efficiency of the rotating nozzle - over 90%.

- Due to the high pressure ratio capability of the rotating nozzle - one stage is required for a pressure ratio of 4:1.

- The combustion chamber static temperature is lower than in a conventional cycle (about 125°C lower) for the same power output Fig. 11.

UNITED STATES PATENT AND TRADEMARK OFFICE
CERTIFICATE OF CORRECTION

| | |
|---|---|
| PATENT NO. | : 7,404,286 B2 |
| APPLICATION NO. | : 10/518767 |
| DATED | : July 29, 2008 |
| INVENTOR(S) | : David Lior |

It is certified that error appears in the above-identified patent and that said Letters Patent is hereby corrected as shown below:

Exiting the rotating nozzles the gases have a certain swirl which is straightened by stationary diffuser vanes as in a conventional gas turbine.

The exit velocity depends on the cycle parameters and the engine type. In high pressure ratio turbojet and turbofan applications the pressure behind the rotating nozzle is kept at about 2 bars by adding a thrust nozzle, and thus the exit mach number is kept subsonic while in high pressure ratio turbo-shafts exiting into ambient conditions the flow may be transonic. In this case a power turbine [8] may be added and the OCN engine would serve as a gas generator.

3. Thermodynamic Cycle Analysis

Appendix A details the thermodynamic analysis. The equations derived are used to calculate the performance of the engine as detailed in the various performance curves.

Fig. 12 shows the OCN cycle in the T-S diagram, in comparison to conventional cycle. The total pressure of the compressor is kept the same for both cycles [this results in higher total temperature for the conventional cycle due to its lower compressor efficiency.]

Obviously, axial compressor stages are added in front of the centrifugal, the latter is limited to a pressure ratio of 8:1 due to mechanical strength limitations.

Two different OCN cycles are analyzed and compared to the conventional cycle-[ A-B-C-D ]

- A-B1-C1-E-D1- Heating the gas in the 2 cycles [having the same compressor pressure ratio of 20] to the same total temperature [1300°K] results in higher power output for the OCN cycle. This is obvious from the larger net area in the T-S diagram which results from the higher compressor and turbine efficiencies. Since the heat input for the two cycles is about identical, the net result is higher efficiency [34% against 29%] and higher specific power [210kW against 181 kW] for the OCN cycle.

- A-B2-C2-F-D2- Heating the gas in the OCN cycle to a total relative temperature identical to the stagnation inlet turbine temperature in the conventional cycle, a higher turbine enthalpy drop is obvious in the diagram for the OCN cycle. This is due to its higher efficiency. Even though the heat input is higher, the net work is higher for the OCN cycle which makes it more efficient. [Efficiency is now 35% and specific power is 256 kW]. The detailed analysis further shows it clearly, as may be calculated from Fig. 11 for this specific case.

UNITED STATES PATENT AND TRADEMARK OFFICE
CERTIFICATE OF CORRECTION

PATENT NO.      : 7,404,286 B2
APPLICATION NO. : 10/518767
DATED           : July 29, 2008
INVENTOR(S)     : David Lior It is certified that error appears in the above-identified patent and that said Letters Patent is hereby corrected as shown below:

4. Performance Analysis

Figs. 13, 14 show the design point performance of the OCN cycle for a gas turbine with an airflow of 1 kg/sec and a relative nozzle inlet temperature of 1000°K and 1300°K. Compressor efficiency is 5% higher than in conventional compressor efficiency for the same pressure ratio. Nozzle expansion efficiency is also 5% higher than in conventional turbines for the same expansion ratio. The variable parameters are P.R - total compressor pressure ratio, and u - nozzle orbital velocity.

It is evident from these figures that there is an optimum value of u for a fixed P.R which results in the maximum efficiency and another value for maximum specific power. Taking a design point of u = 500 m/sec (an acceptable value for superalloys), Cu=400m/sec, a nozzle inlet relative temperature of 1300°K and a P.R of 20, the net thermal efficiency is 35% and the power is 256 kW/kg/sec.

Increasing the pressure ratio up to 36 [ by adding more compressor stages in front ] while the rotating velocity is 600 m/sec results in an efficiency of 38.3%.

Figs. 15, 16 depict the OCN versus the conventional cycle performance in various turbine [nozzle] inlet temperatures. For example [see C , D] a conventional cycle with the same P.R and the same turbine inlet stagnation temperature of 1300°K, but with 5% reduced efficiencies for both compressor and turbine the performance is: Power - 181 kW/kg/sec; Efficiency - 29%.,compared to 35% and 256kw of the OCN engine.

Figs. 15, 16 also show the OCN and conventional cycle performance when the speed [and pressure ratio] are constant and the inlet temperature changes. In the OCN cycle the efficiency drops mildly [from 35 to 29%] with the specific power when the temperature drops from 1300°K to 1000°K, while the efficiency of the conventional cycle for the same temperature reduction drops to 8% [see E, F]. This is a significant advantage of the OCN cycle in reduced temperatures in contrast to the poor efficiency of conventional gas turbines.

Analyzing the cycle for high pressure ratio turbojet or turbofan engineFigs. 17, 18 we arrive at the same relative improvement compared to a conventional cycle for specific thrust and S.F.C. values. This superior performance coupled with reduced weight and cost make this engine far more cost effective than a conventional gas turbine.

The advantage of the OCN engine compared to the conventional cycle is thus significant in nozzle inlet temperatures between 1000°K - 1400°K. [Actually, even at inlet temperature of 1600°K the efficiency gain is still 2.5%].

- The thermal efficiency is higher by 4%-21% [absolute value]

UNITED STATES PATENT AND TRADEMARK OFFICE
CERTIFICATE OF CORRECTION

PATENT NO.       : 7,404,286 B2
APPLICATION NO.  : 10/518767
DATED            : July 29, 2008
INVENTOR(S)      : David Lior It is certified that error appears in the above-identified patent and that said Letters Patent is hereby corrected as shown below:

- The specific power is higher throughout the full temperature range by 50-100 %
- The low temperature performance is attractive compared to a conventional cycle.
- The static turbine [nozzle] inlet temperatures are lower by 140°K for the same power requirement. (See Fig. 15 line D-D').

5. Part load performance

Figs. 19, 20 describe the part load performance of an industrial OCN gas turbine with a free turbine when its design point is:

Compressor P.R = 24

Turbine relative total inlet temperature = 1300°K

Airflow = 2.7 kg/sec

Decreasing its turbine inlet temperature the gas generator main shaft speed decreases too, while its free turbine speed is kept constant.

Due to the high adiabatic efficiencies of compression and expansion there is only slight decrease of thermal efficiency [from 35% to 27%] when the load decreases to 30% of its load at 1300°K. In the conventional cycle the thermal efficiency drops to 17% for 30% load.

The above advantages decrease with higher total temperature or in lower pressure ratio. This makes the OCN engine attractive for industrial turbines for electrical energy generation where the long life requirements dictate low turbine inlet temperature, for heavy vehicular use where the part load efficiency is most important and for small efficient aircraft engines where the size and weight are important, a market dominated for over a 100 years by heavy piston engines.

Conclusions

1. The OCN engine cycle is superior to the conventional cycle up to a turbine [nozzle] inlet temperature of 1600k both in specific power and efficiency. This advantage decrease in higher temperature or lower pressure ratio.

2. The OCN engine offers a solution to a new power propulsion concept, presenting a compact configuration, having a specific power and thermal efficiency better than conventional gas turbines.

3. Due to its higher compression and expansion efficiencies the OCN engine thermal efficiency is high even at a 30% load, which is a considerable advantage compared to conventional gas turbines.

UNITED STATES PATENT AND TRADEMARK OFFICE
CERTIFICATE OF CORRECTION

| | |
|---|---|
| PATENT NO. | : 7,404,286 B2 |
| APPLICATION NO. | : 10/518767 |
| DATED | : July 29, 2008 |
| INVENTOR(S) | : David Lior |

It is certified that error appears in the above-identified patent and that said Letters Patent is hereby corrected as shown below:

4. The OCN engine delivers the same power as a conventional gas turbine with a lower turbine [nozzle] inlet temperature of about 140°K.

5. Having fewer compressor and turbine stages for the same total pressure ratio the OCN engine has lower weight, less volume, and lower cost.

6. The OCN engine is thus a better cost effective engine suitable to various applications. In particular, due to its flat curve, the OCN engine is a better power plant for small aircraft, gas turbines, and vehicular use such as cars and trucks.

UNITED STATES PATENT AND TRADEMARK OFFICE
CERTIFICATE OF CORRECTION

| | |
|---|---|
| PATENT NO. | : 7,404,286 B2 |
| APPLICATION NO. | : 10/518767 |
| DATED | : July 29, 2008 |
| INVENTOR(S) | : David Lior |

It is certified that error appears in the above-identified patent and that said Letters Patent is hereby corrected as shown below:

OCN PERFORMANCE CALCULATION

Power

The power is derived by computing first the reaction force Fr which is:

$$F_r = m(w_{4u} - w_{3u})$$

where:

- m - the nozzle exhaust flow rate
- u - the rotating tangential nozzle velocity
- $w_{4u}$ - the exhaust gas tangential velocity
- $c_u$ - absolute tangential nozzle inlet velocity
- $w_{3u} = u_3 - C_{3u}$ - relative tangential nozzle inlet velocity.

The turbine power is the product of $$F_r \times u$$

$$P_n = m(w_{4u} - w_{3u})u$$

and for $w_{3u} = 0$, $$P_n = m\, w_{4u}\, u \qquad (1)$$

Note:

In the case of an axial inlet into the nozzle - in the relative space - $W_{3u} = 0$, and we carry further the calculation with this assumption, but it can be shown that the calculation result for the value of $w_{3u}$ is identical for any value of $w_{3u}$.

The net power is derived by subtracting the compressor power $P_c$ from the nozzle power $Pn$ $$P_{net} = P_n - P_c$$

The compressor power $P_c$, for m = 1 kg/sec is derived by calculating the enthalpy change across the compressor:

$$P_c = \frac{C_p(T_{2t} - T_{1t})}{\eta_m} =$$

$$= \frac{T_{1t}}{\eta_c \eta_m}\left[\left(\frac{P_{2t}}{P_{1t}}\right)^{\frac{K-1}{K}} - 1\right] \qquad (2)$$

in Which:

- $\eta_c$ - adiabatic compressor efficiency
- $\eta_m$ - mechanical compressor efficiency
- $T_{1t}$ - compressor inlet total temperature
- $T_{2t}$ - compressor outlet total temperature

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

$P_{1t}$ - compressor inlet total pressure
$P_{2t}$ - compressor outlet total pressure The nozzle power $P_n$ is also derived from thermodynamics as follows:

$$P_n = C_{\bar{p}}(T_{3t} - T_{4t}) \quad (3)$$

in Which:

$T_{3t}$ - nozzle total inlet temperature
$T_{4t}$ - nozzle total outlet temperature.

may also be expressed by:

$$T_{3t} = T_{3R} + \frac{u^2}{2C_{\bar{p}}} \quad (4)$$

$$T_{4t} = T_{4s} + \frac{(w_4 - u)^2}{2C_{\bar{p}}} \quad (5)$$

Where:

$T_{4s}$ - static temperature at nozzle outlet
$T_{3R}$ - relative total temperature at nozzle inlet.

Thus:

$$P_n = \left[\left(T_{3R} + \frac{u^2}{2C_{\bar{p}}}\right) - \left(T_{4S} + \frac{(w_4 - u)^2}{2C_{\bar{p}}}\right)\right] \quad (6)$$

Combining Eqs. (1) and (4) results in: [for 1kg/sec]

$$(w_{4u})u = P_n =$$

$$= C_{\bar{p}} \cdot \left[T_{3R} + \frac{u^2}{2C_{\bar{p}}} - T_{4s} - \frac{w_4^2}{2C_{\bar{p}}} + \frac{(w_{4u})u}{C_{\bar{p}}} - \frac{u^2}{2C_{\bar{p}}}\right] \quad (7)$$

$$= C_{\bar{p}} \cdot \left[(T_{3R} - T_s) - \frac{w_4^2}{2C_{\bar{p}}} + \frac{(w_{4u})u}{C_{\bar{p}}}\right]$$

$$= C_{\bar{p}}(T_{3R} - T_{4s}) - \frac{w_4^2}{2} + (w_{4u})u$$

If the exhaust velocity is tangential then $$w_{4u} = w_T \quad ;$$

and $$\frac{w_4^2}{2} = C_{\bar{p}}(T_{3R} - T_{4s}) \quad (8)$$

Including the nozzle efficiency results in:

$$w_4^2 = (T_{3R} - T_{4is}) \cdot 2C_{\bar{p}} \cdot \eta_n \quad (9)$$

Where $T_{4is}$ = isentropic static temperature at nozzle exit.

Calculating $T_{4is}$ is done by evaluating the diffuser performance. Total pressure at the diffuser outlet is the

UNITED STATES PATENT AND TRADEMARK OFFICE
CERTIFICATE OF CORRECTION

PATENT NO.        : 7,404,286 B2
APPLICATION NO.   : 10/518767
DATED             : July 29, 2008
INVENTOR(S)       : David Lior It is certified that error appears in the above-identified patent and that said Letters Patent is hereby corrected as shown below:

ambient pressure. Assuming the exit velocity is null and the diffuser efficiency is 100%:

$$p_o = p_{4s}\left(1 + \frac{k-1}{2}M_4^2\right)^{\frac{k}{k-1}} \quad (10)$$

Where $M_4$ is the local static Mach number at the diffuser inlet and is derived from its definition:

$$M_4 = \frac{(w_4 - u)}{\sqrt{kRT_{4s}}} \quad (11)$$

Equation (9) may be expressed as a function of the pressure ratio across the nozzle $$\frac{w_4^2}{2C_p} = T_{3R} - T_{4s} = T_{3R} \cdot (1 - \frac{T_{4s}}{T_{3R}}) =$$

$$= T_{3R}\left[1 - \left(\frac{1}{p_{3R}/p_{4s}}\right)^{\frac{k-1}{k}}\right] \quad (12)$$

Combining Eqs. (10), (11) and (12) results in a single expression for the nozzle exit velocity:

$$w_4^2 = 2C_p \eta_n T_{3R}\left[1 - \frac{\left(\frac{p_a}{p_{3R}}\right)^{\frac{k-1}{k}}}{1 + \frac{k-1}{2}\frac{(w_4-u)^2}{kR\left(T_{3R} - \frac{w_4^2}{2C_p}\right)}}\right] \quad (13)$$

Which may be solved mathematically once the values of $T_{3R}$, $u$ are chosen and introduced.

The diffuser efficiency value decrease the calculated nozzle exit velocity w according to the definition of efficiency:

$$\eta_d = \left(\frac{w_x - u}{w_4 - u}\right)^2$$

to its actual value $w_x$.

Hence:

$$w_x = u + \left(\sqrt{\eta_d}\right)(w_4 - u) \quad (14)$$

Now the value of $w_x$ is used to calculate the net power using Eq. (1).

The value of $p_{3R}$ Which is the total relative pressure at the nozzle inlet is calculated by subtracting

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

the combustion pressure drop $\Delta P$ from the value of $P_{2R}$ Which is the relative total pressure at the compressor exit and is calculated as follows:

$$\frac{P_{2t}}{P_{2R}} = \left(\frac{T_{2t}}{T_{2R}}\right)^{\frac{k-1}{k}} = \left(\frac{T_{2t}}{T_{2t} - \frac{(2c_{2u} - u)u}{2C_p}}\right)^{\frac{k-1}{k}} \quad (15)$$

Where:

- $P_{2t}$ — total pressure at the compressor exit and is determined by the choice of the pressure X
- $T_{2t}$ — total temperature at compressor exit.
- $C_{2u}$ — tangential component of compressor exit velocity.

UNITED STATES PATENT AND TRADEMARK OFFICE
CERTIFICATE OF CORRECTION

PATENT NO. : 7,404,286 B2
APPLICATION NO. : 10/518767
DATED : July 29, 2008
INVENTOR(S) : David Lior It is certified that error appears in the above-identified patent and that said Letters Patent is hereby corrected as shown below:

Thermal efficiency calculation $$\eta_{th} = \frac{\text{net power output}}{\text{thermal power input}}$$

The thermal power input is invested in the fuel injected into the combustion chamber raising the temperature from $T_{2R}$ to $T_{3R}$. Where $T_{2R}$ is derived from Eq. (15):

$$T_{2R} = T_{2I} + \frac{u^2}{2C_{\bar{p}}} - \frac{uc_u}{C_{\bar{p}}}$$

Hence the thermal power input is:

$$E_{th} = \frac{C_{\bar{p}}}{\eta_{com}}(T_{3R} - T_{2R})$$

Where $\eta_{com}$ is the combustion efficiency.

Introducing the net power output from Eq. (1) the thermal efficiency is:

UNITED STATES PATENT AND TRADEMARK OFFICE
CERTIFICATE OF CORRECTION

PATENT NO. : 7,404,286 B2 Page 15 of 22
APPLICATION NO. : 10/518767
DATED : July 29, 2008
INVENTOR(S) : David Lior It is certified that error appears in the above-identified patent and that said Letters Patent is hereby corrected as shown below:

$$\eta_{th} = \frac{w_x u - P_c}{\left(\dfrac{C_p}{\eta_{com}(T_{3R} - T_{2R})}\right)} \quad (16)$$

Calculation Sequence

Input – $C.P.R.$; $T_{3R}$; $\eta_c$; $\eta_m$; $c_{2u}$; $u$; $\Delta P_{combustor}$; $\eta_N$; $\eta_P$

| | | |
|---|---|---|
| I | Find $P_c$ | Eq. (2). |
| II | Find $P_{2A}$ and $P_{3R}$ | Eq. (15)) |
| III | Find $w_4$ | Eq. (13). |
| IV | Find $w_x$ | Eq. (14) |
| V | Find Net power | Eq. (1). |
| VI | Find $\eta_{th}$ | Eq. (16). |

Fig. 11 – OCN Turbo shaft Engine - Example
Net Power=630 kW; $n_1$=54,000 rpm; $n_2$=45,000 rpm
G=2.7 Kg/sec; Compressor P.R.=16; $T_{combustor}$=1260°K; Thermal Efficiency=35%
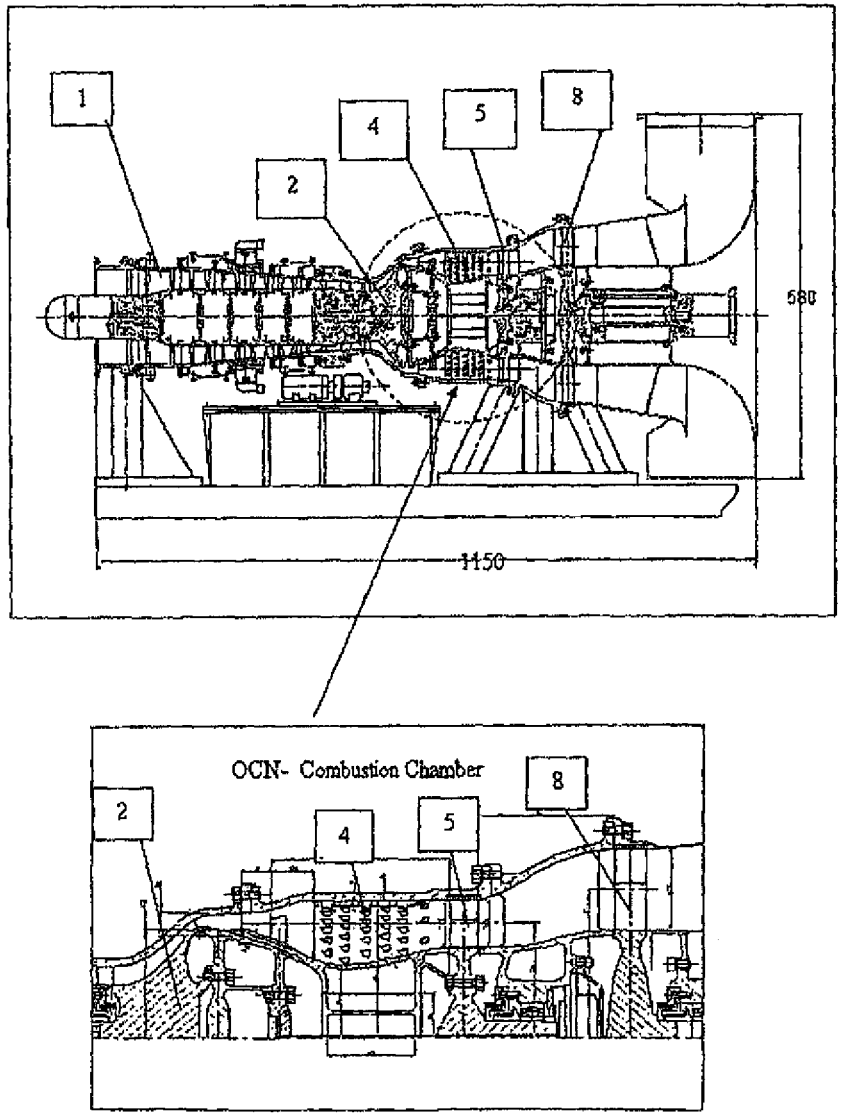

Fig. 12 - OCN T-S Diagram
| line style | Cycles | Efficiency | Power | $\eta_c$ | $\eta_t$ |
|---|---|---|---|---|---|
| ............... | Conventional = A-B-C-D | 29% | 181 kW | 80% | 87% |
| — — — · | OCN, $T_t$=1300° K = A-E-B1-C1-F-D1 | 34% | 210 kW | 85% | 92% |
| ———— | OCN, $T_R$=1300° K = A-E-B2-C2-G2-D2 | 35% | 256 kW | 85% | 92% |
| | Compressor P.R = 20; u = 500 m/sec; Cu = 400 m/sec. | | | | |
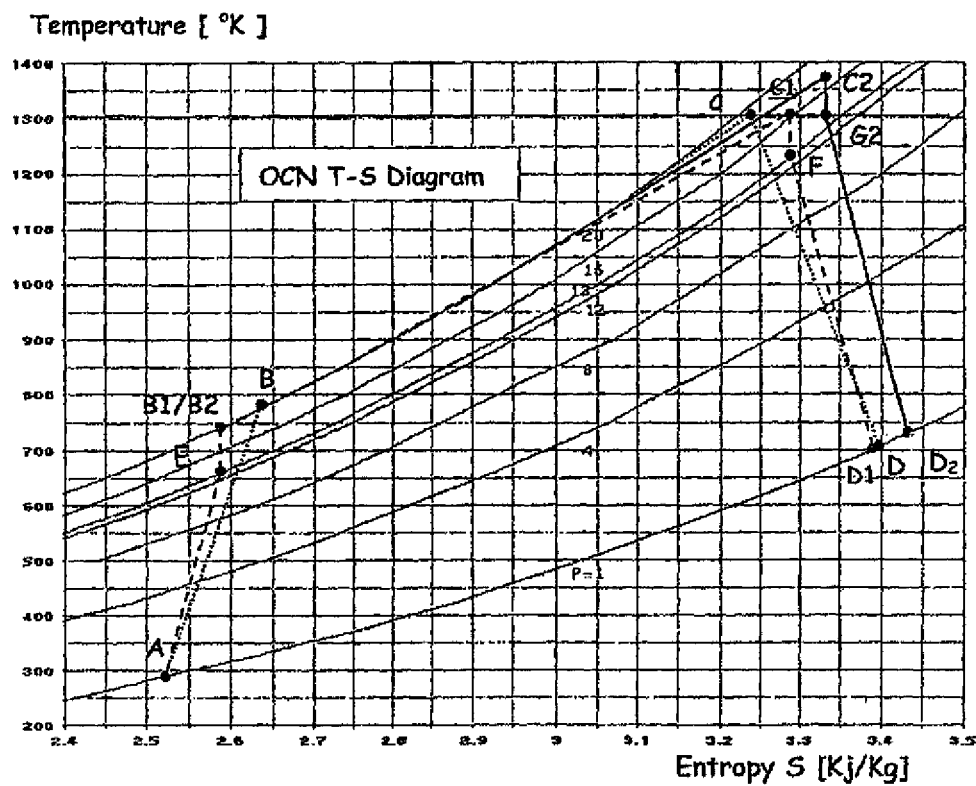
|  | A | B | B1,B2 | C | C1 | C2 | D | D1 | D2 | E | F | G2 |
|---|---|---|---|---|---|---|---|---|---|---|---|---|
| T °K | 288 | 777 | 748 | 1300 | 1300 | 1370 | 707 | 702 | 731 | 668 | 1230 | 1300 |
| P Bar | 1 | 20 | 20 | 19.5 | 15.5 | 16 | 1 | 1 | 1 | 13 | 13 | 13 |

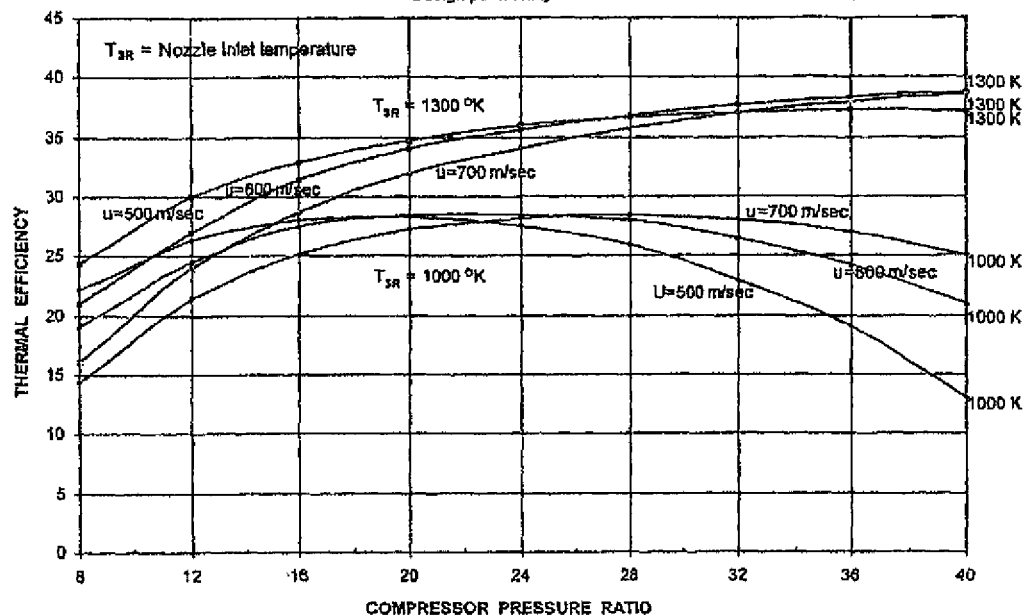
Fig. 13 O.C.N THERMAL EFFICIENCIES
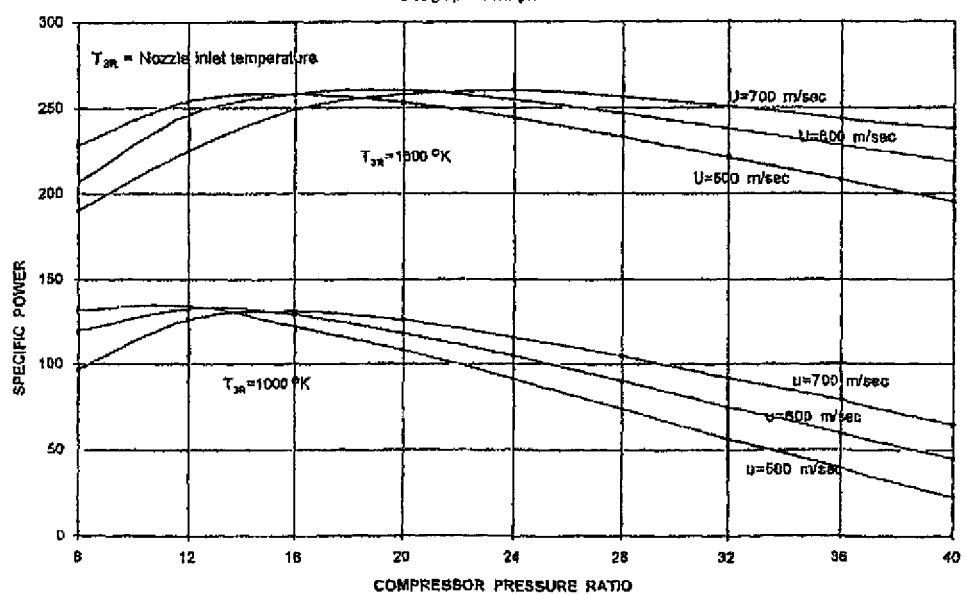
Fig. 14 O.C.N SPECIFIC POWER

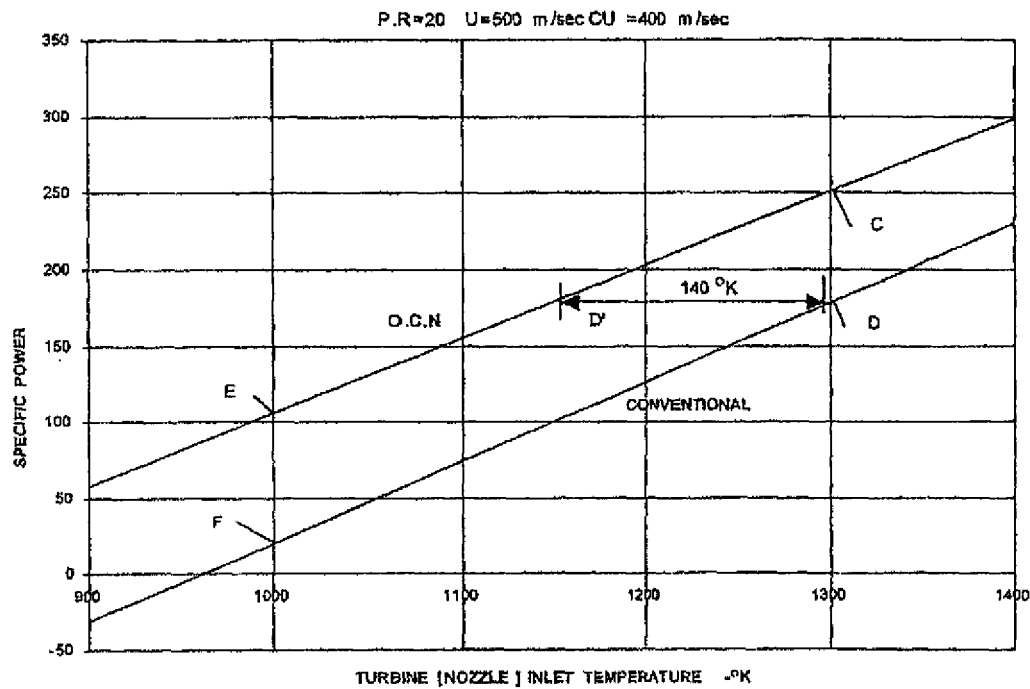
Fig. 15 – O.C.N AND CONVENTIONAL GAS TURBINE SPECIFIC POWER
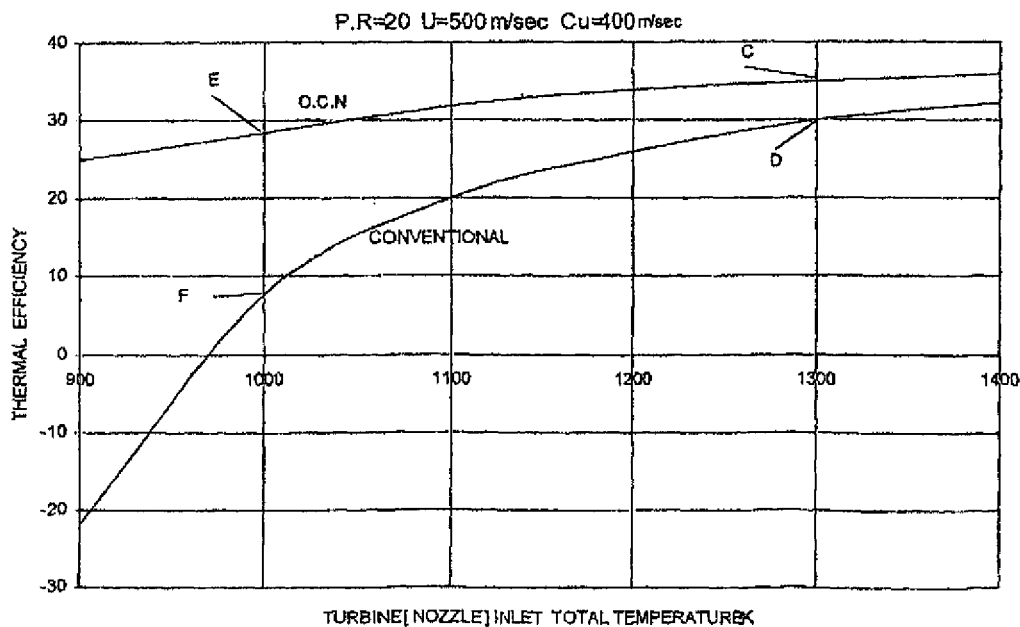
Fig. 16 – O.C.N AND CONVENTIONAL GAS TURBINE EFFICIENC

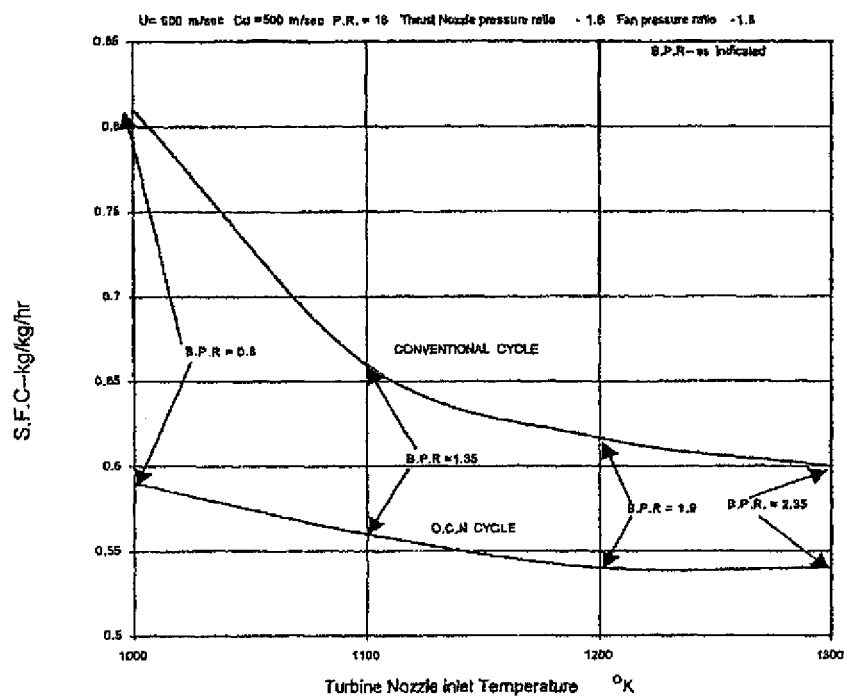
Fig. 17 O.C.N TURBOFAN S.F.C.
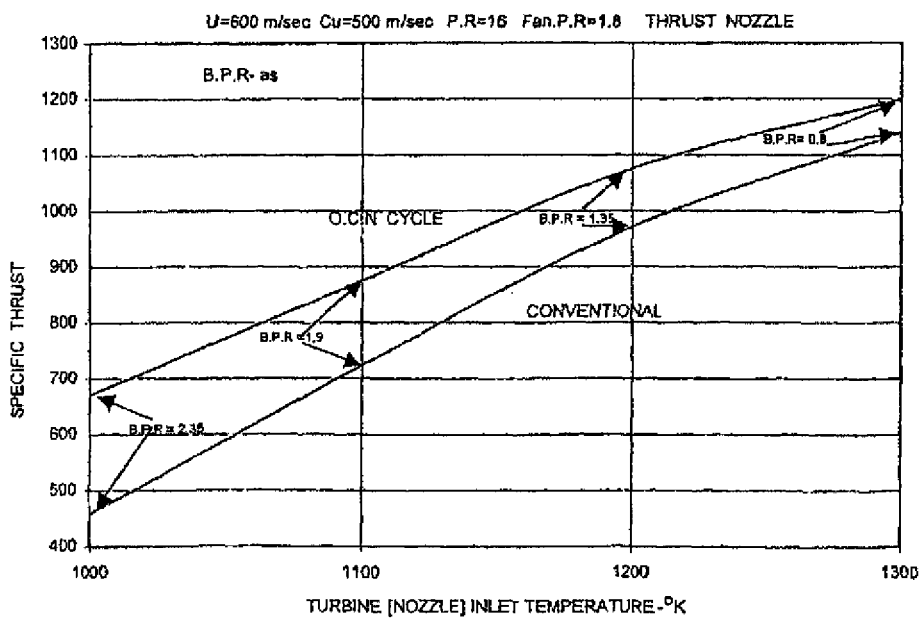
Fig. 18 O.C.N TURBOFAN THRUST

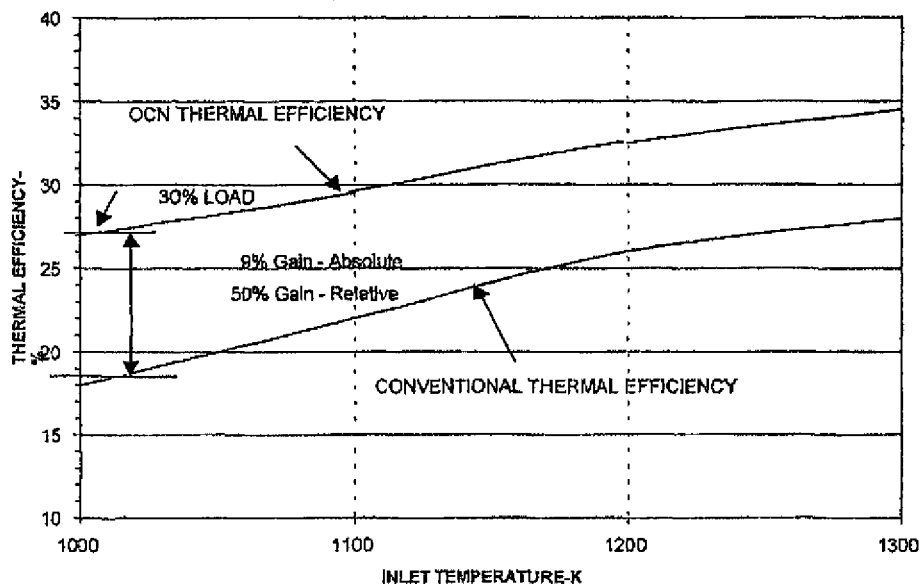
Fig. 19 – EFFECT OF PART LOAD ON THERMAL EFFICIENCY
OCN DESIGN POINT: C.P.R.=24; TURBINE INLET TEMPERATURE=1300°K; AIR FLOW=2.7 kg/sec
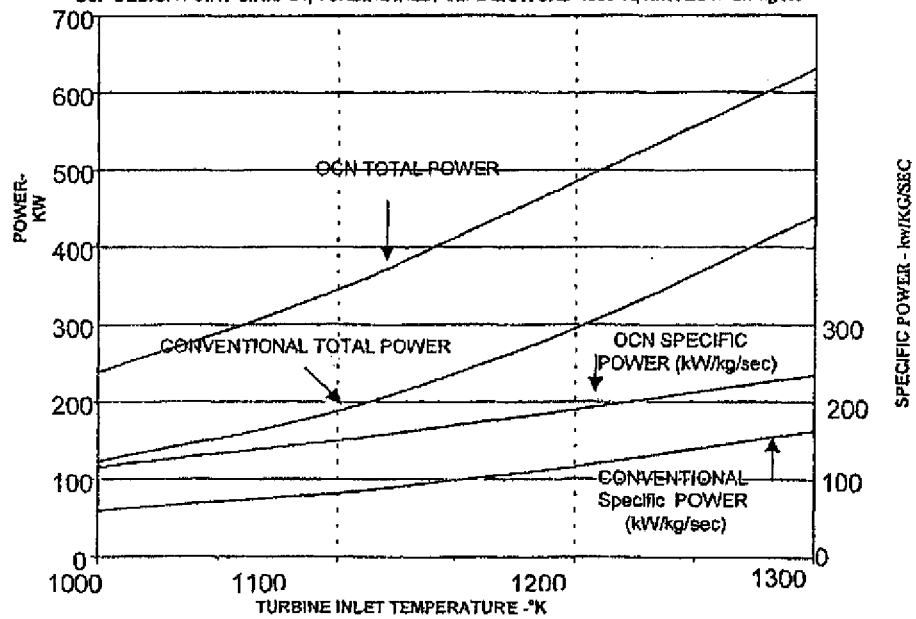
Fig. 20 EFFECT OF PART LOAD ON POWER
OCN DESIGN POINT C.P.R.=24; TURBINE INLET TEMPERATURE=1300°K; AIR FLOW=2.7 kg/sec
Fig 11. Velocity Triangles $U = U_2 = U_3 = U_4$
Compressor Outlet
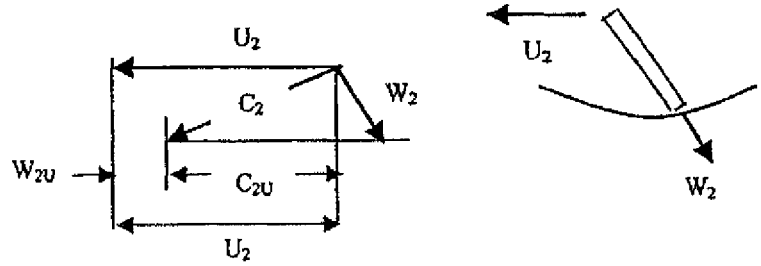
Turbine Inlet
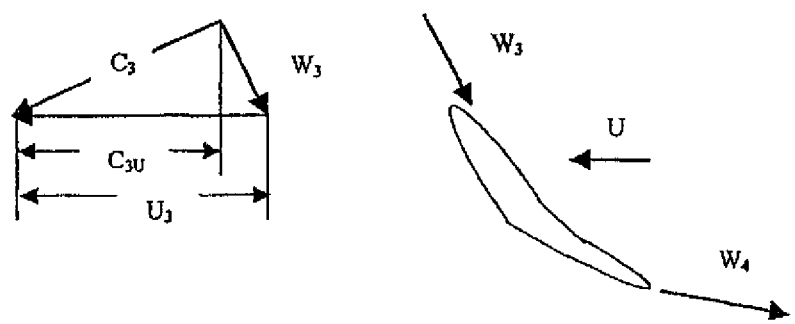
Turbine Outlet
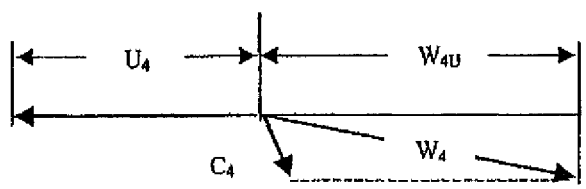
Fig. 21